Dec. 30, 1924.

W. TAYLOR 1,521,339

OPTICAL APPARATUS FOR INSTRUCTIONAL PURPOSES

Filed Nov. 2, 1922   15 Sheets-Sheet 1

INVENTOR
William Taylor
BY
his ATTORNEY

Dec. 30, 1924.
W. TAYLOR
OPTICAL APPARATUS FOR INSTRUCTIONAL PURPOSES
Filed Nov. 2, 1922    15 Sheets-Sheet 2
1,521,339
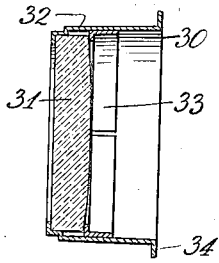
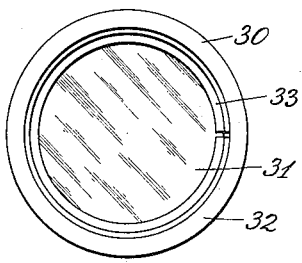
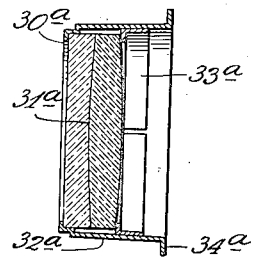
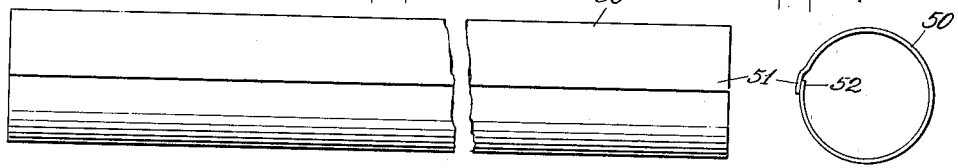
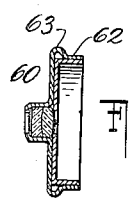
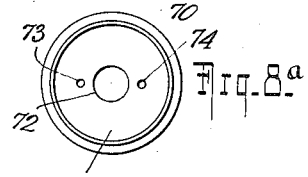
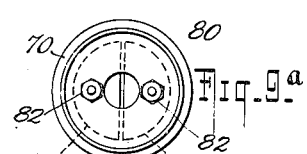
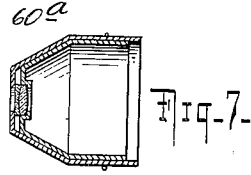
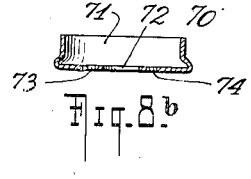
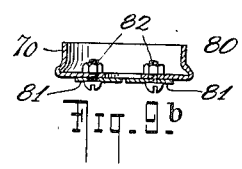
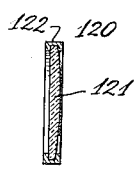
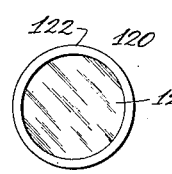
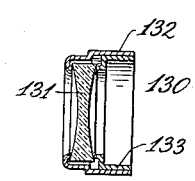
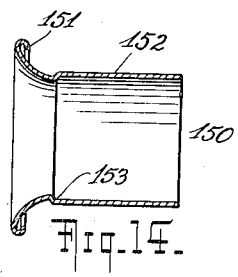
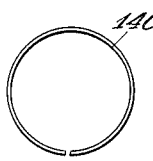
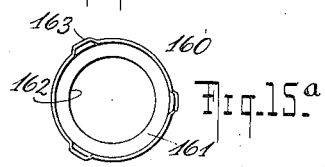
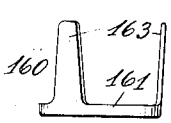
INVENTOR
William Taylor
BY Arthur L. Rue
ATTORNEY

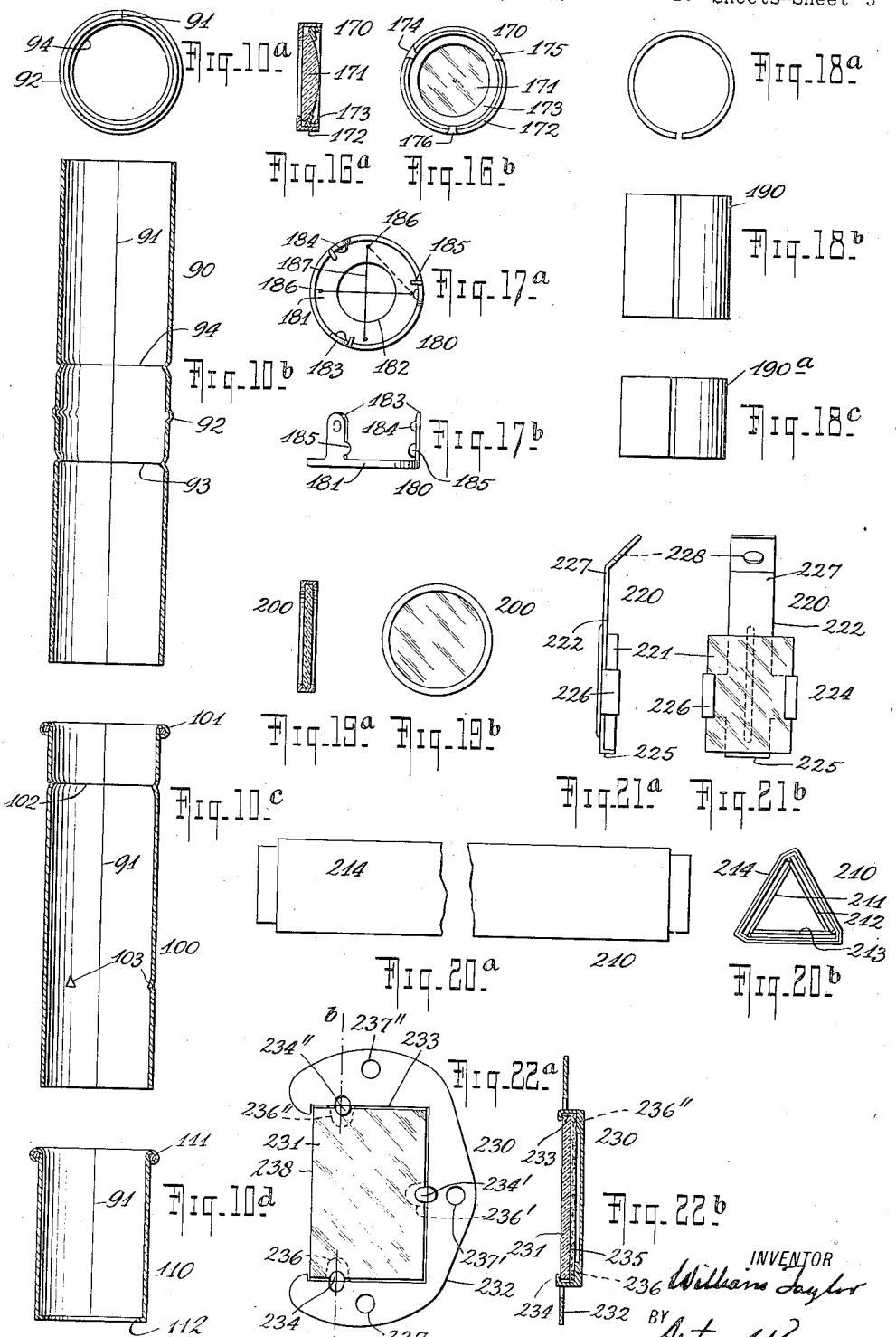

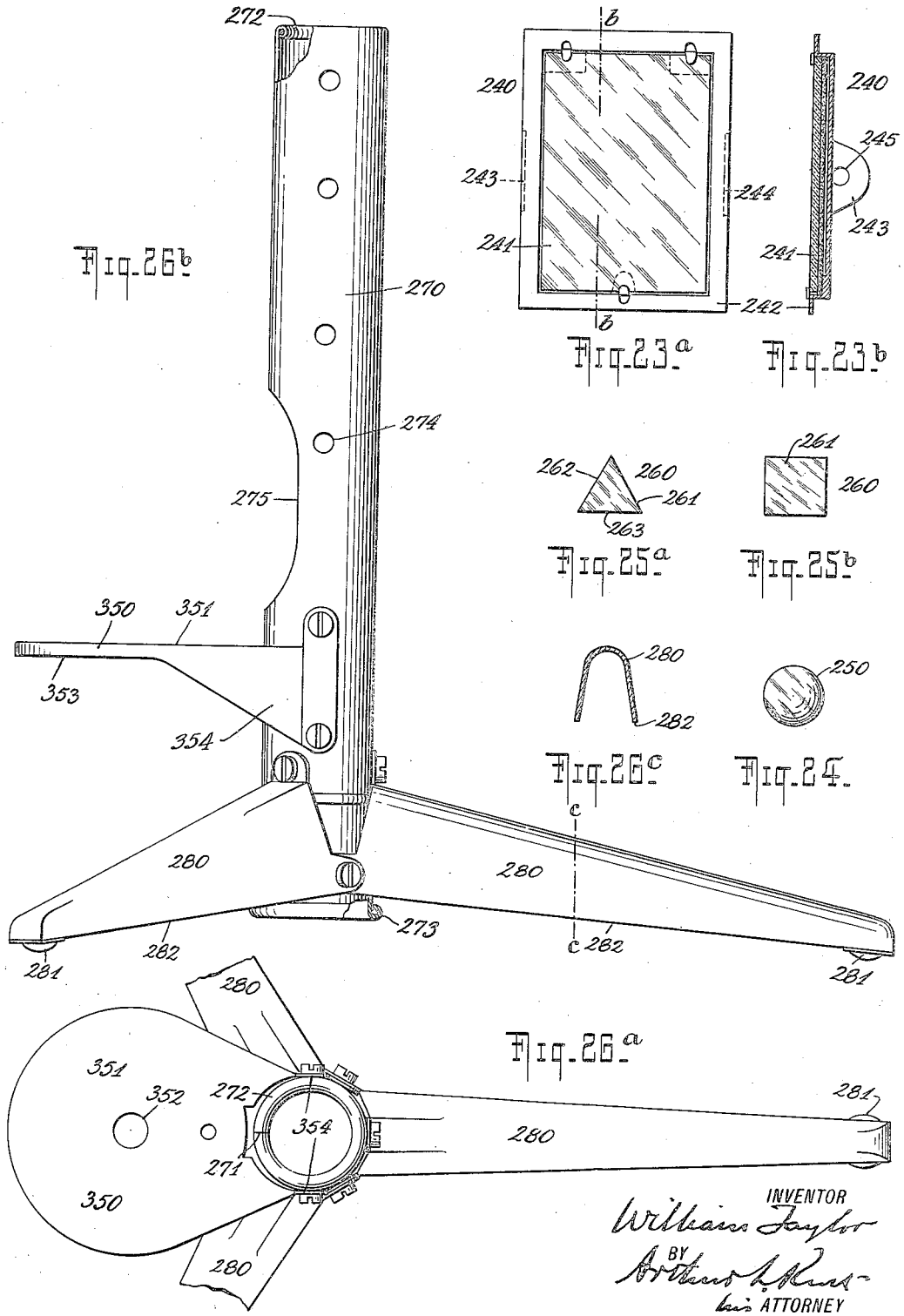

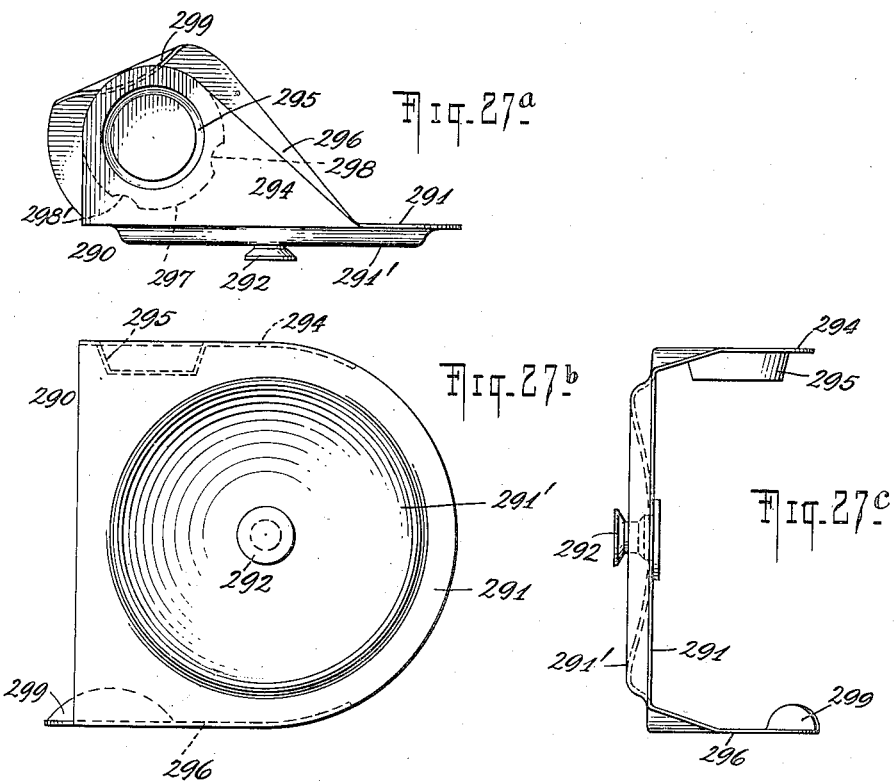
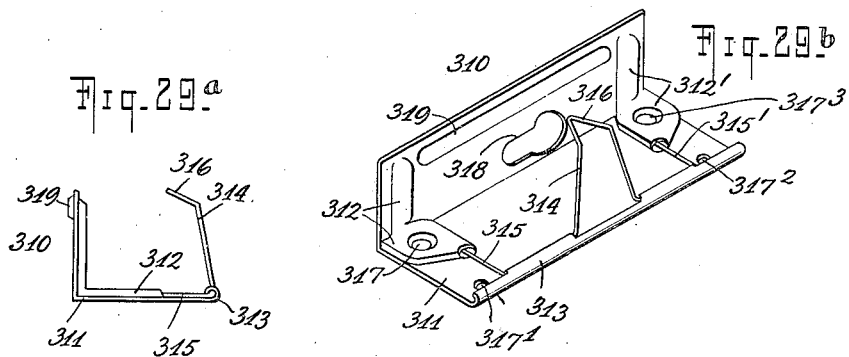

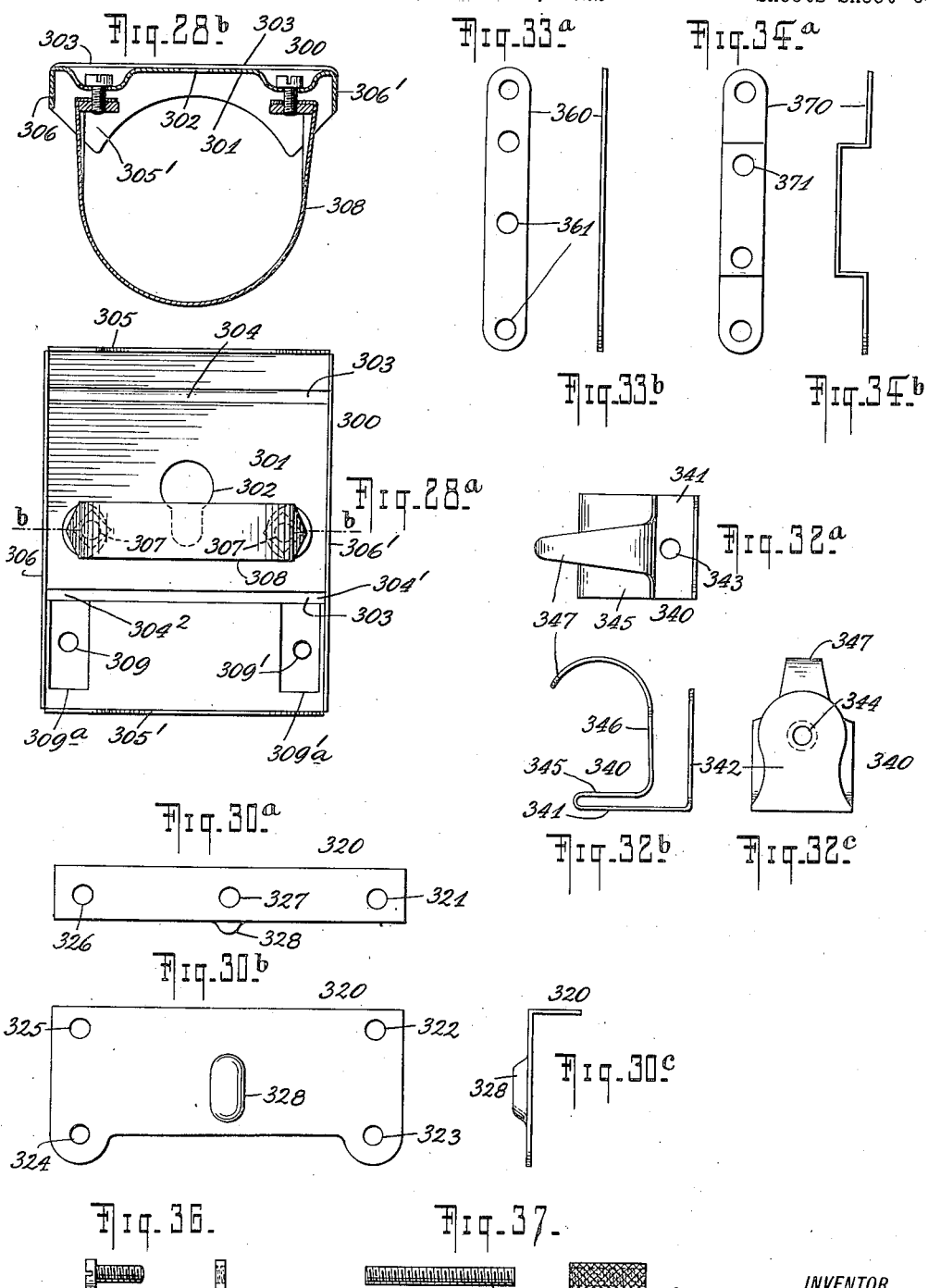

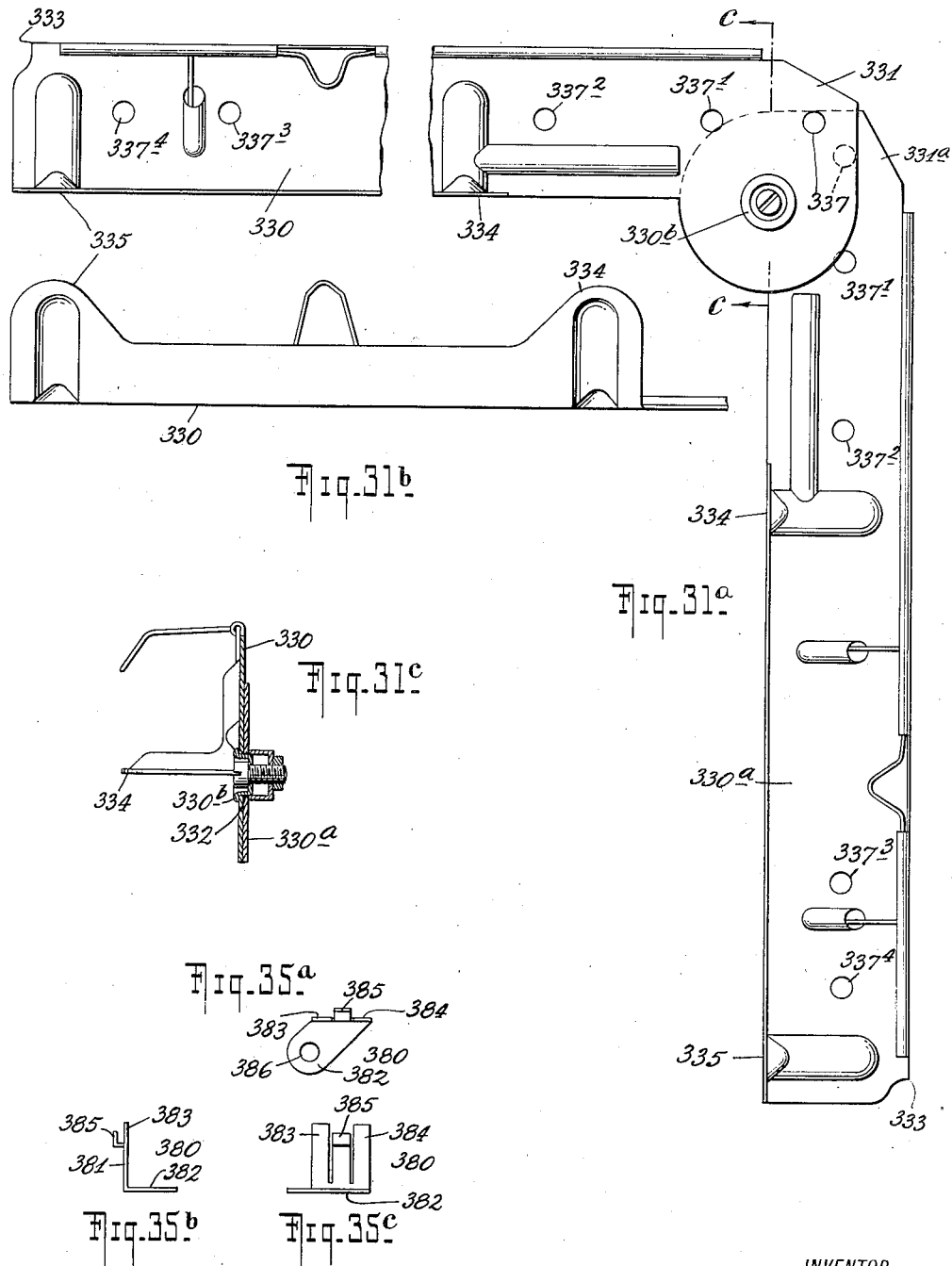

Dec. 30, 1924.
W. TAYLOR
1,521,339
OPTICAL APPARATUS FOR INSTRUCTIONAL PURPOSES
Filed Nov. 2, 1922 15 Sheets-Sheet 8
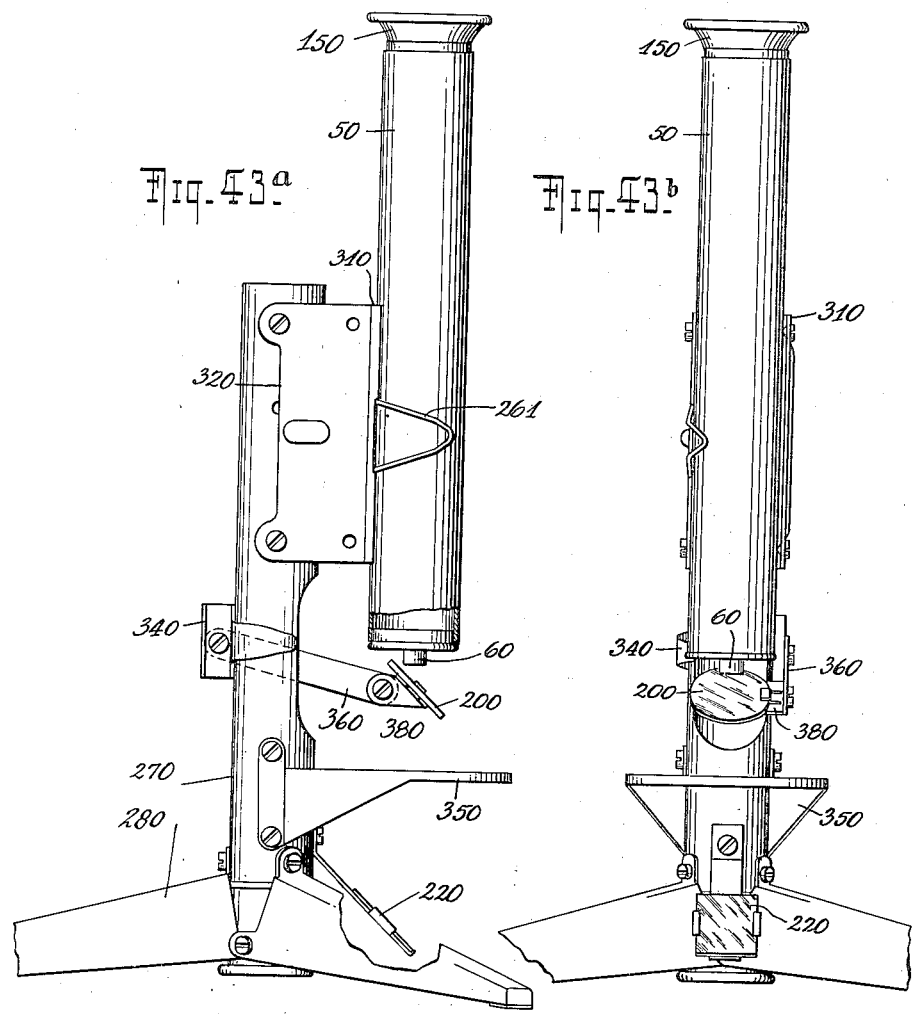
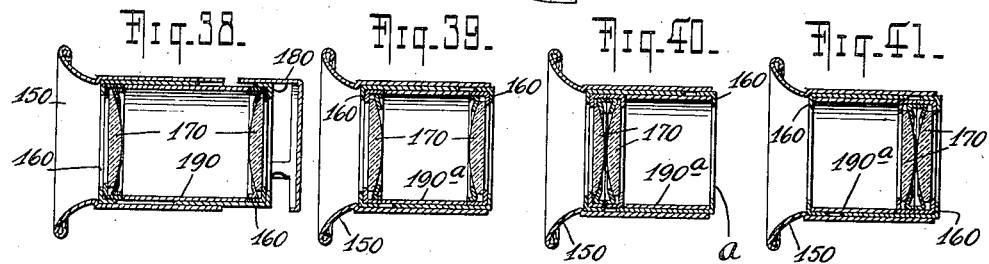
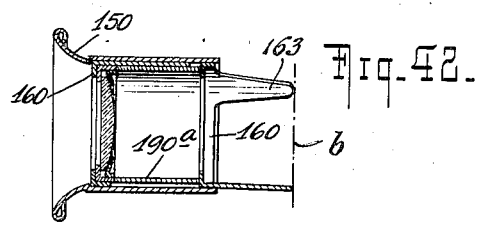
INVENTOR
William Taylor
BY
Arthur J. Kent
ATTORNEY

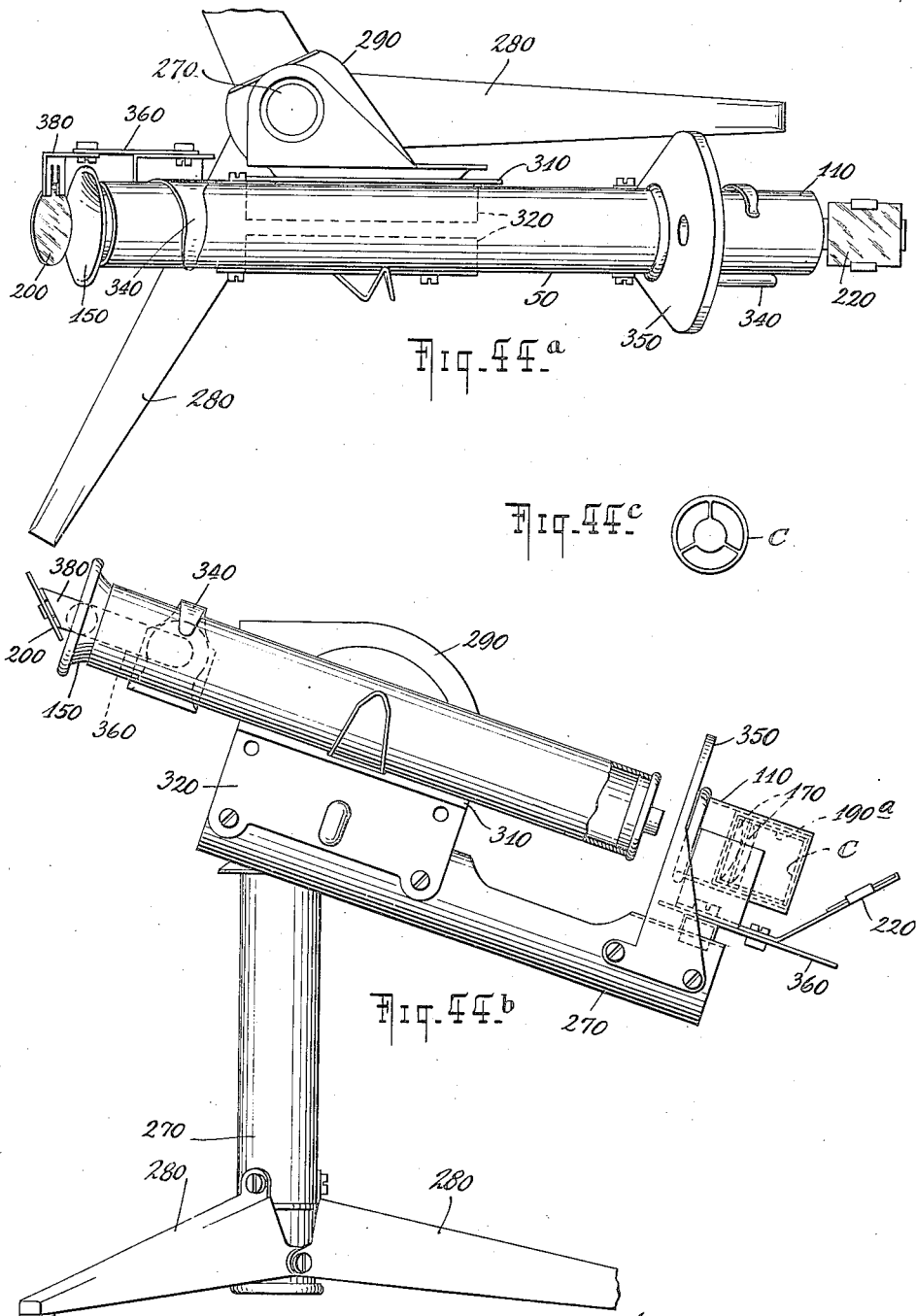

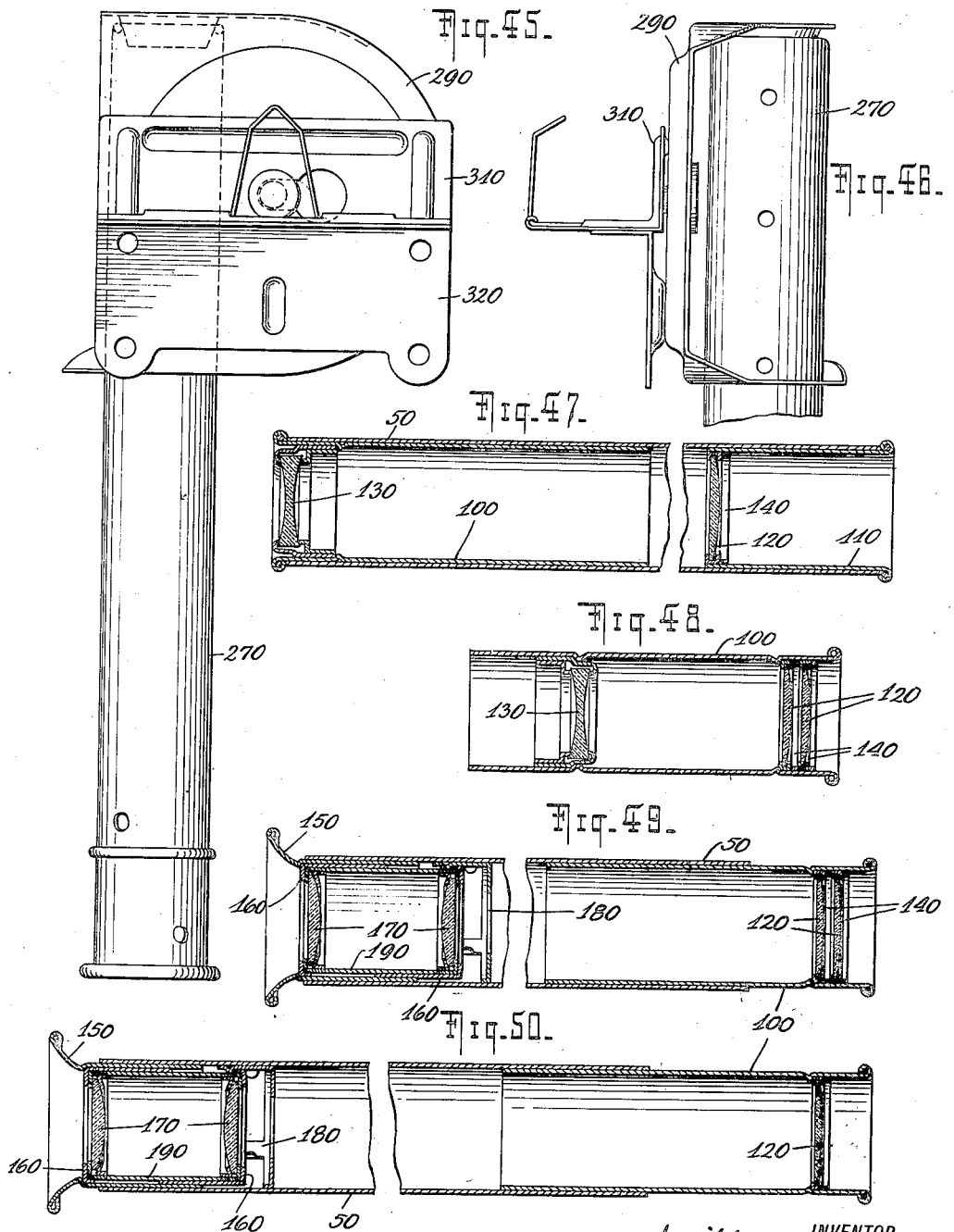

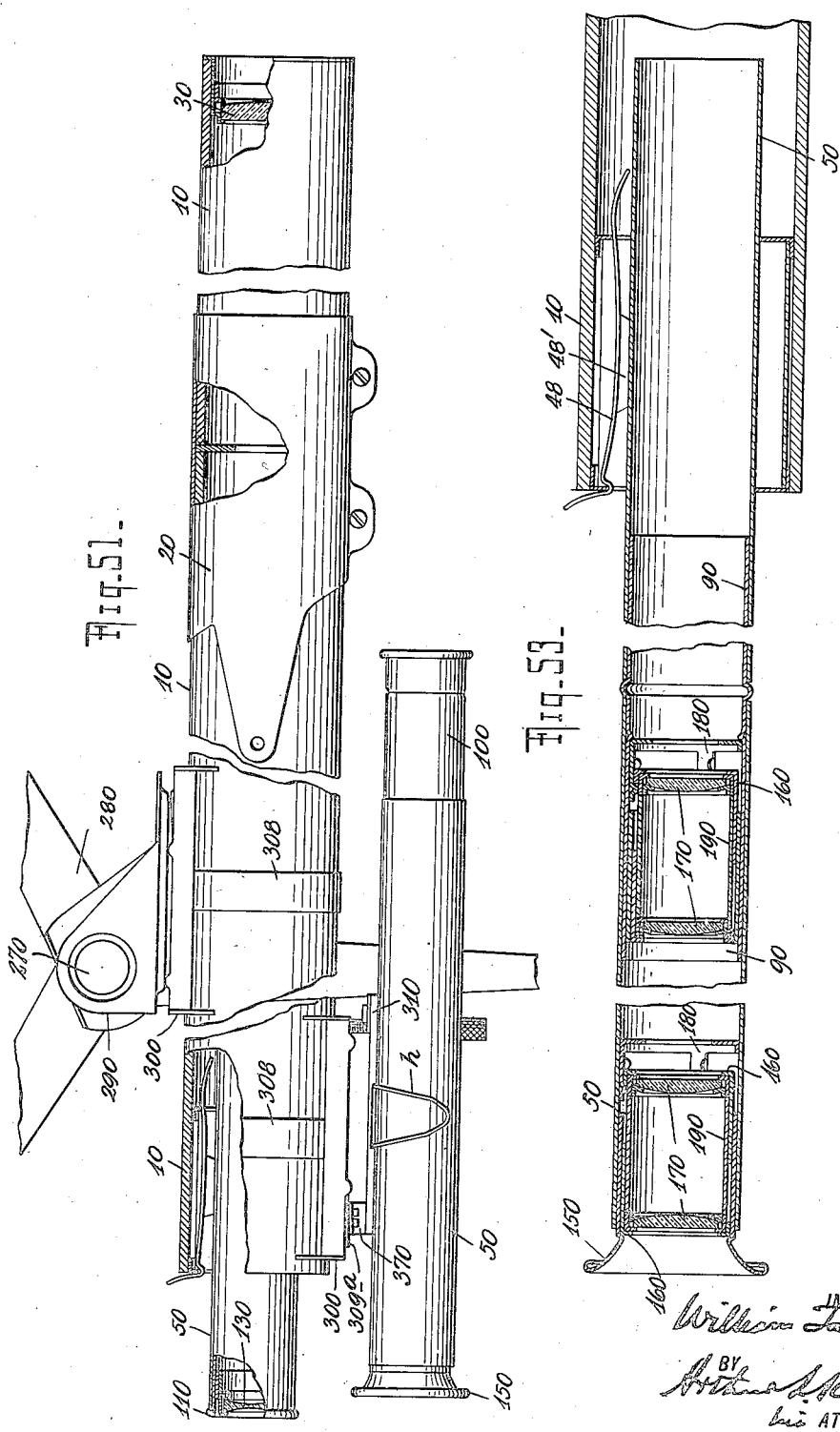

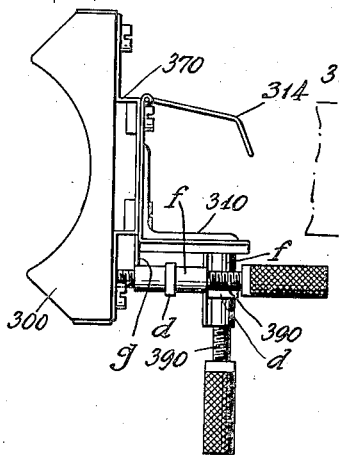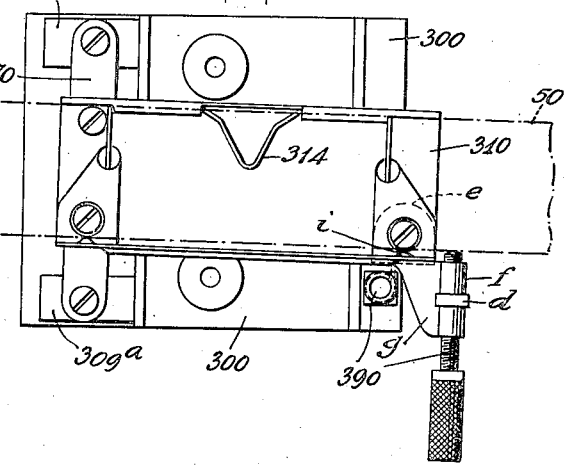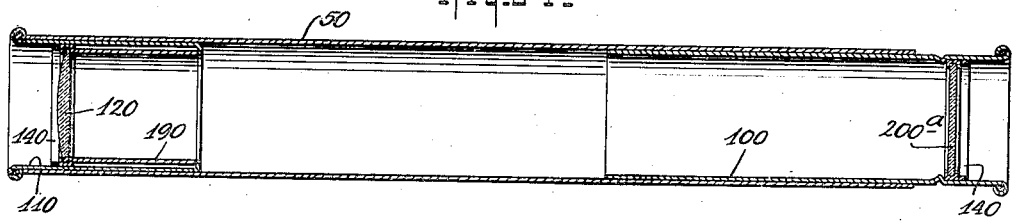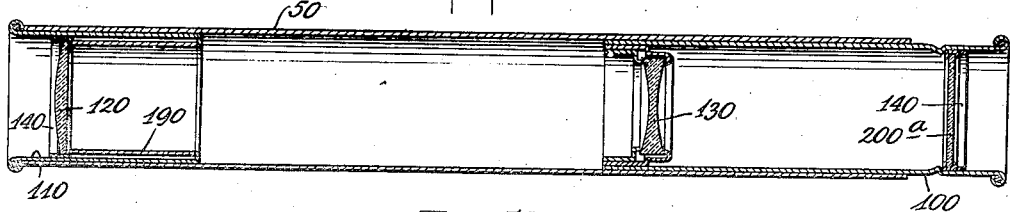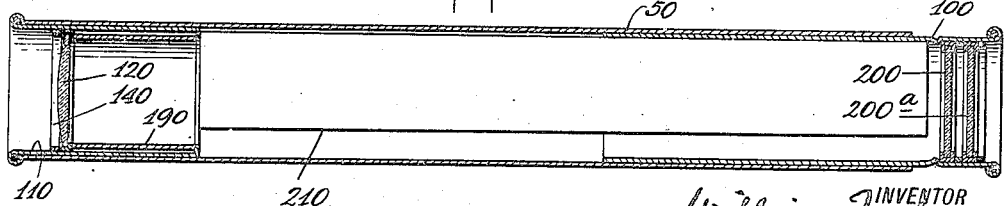

Dec. 30, 1924.  
W. TAYLOR  
1,521,339  
OPTICAL APPARATUS FOR INSTRUCTIONAL PURPOSES  
Filed Nov. 2, 1922  
15 Sheets-Sheet 13
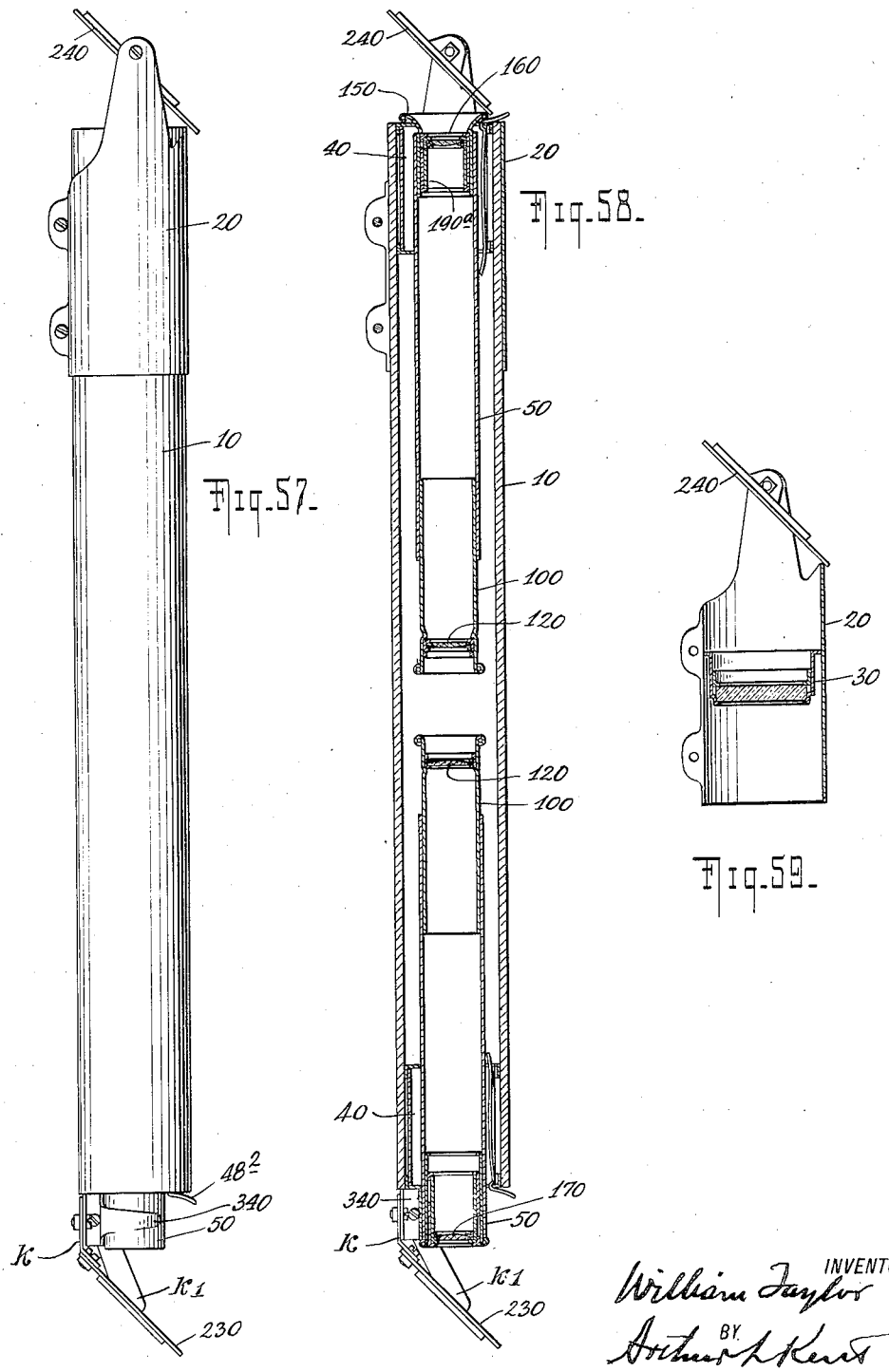

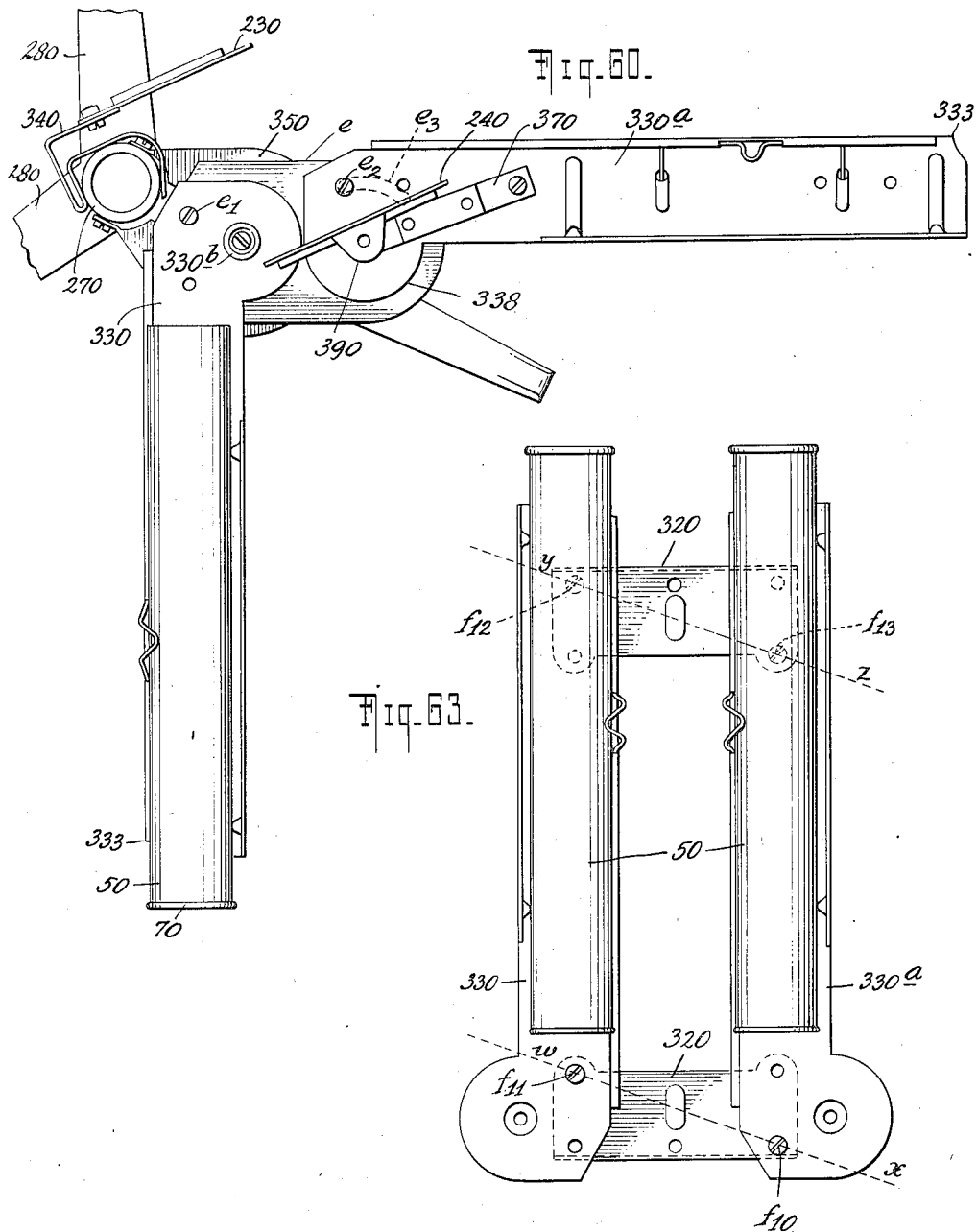

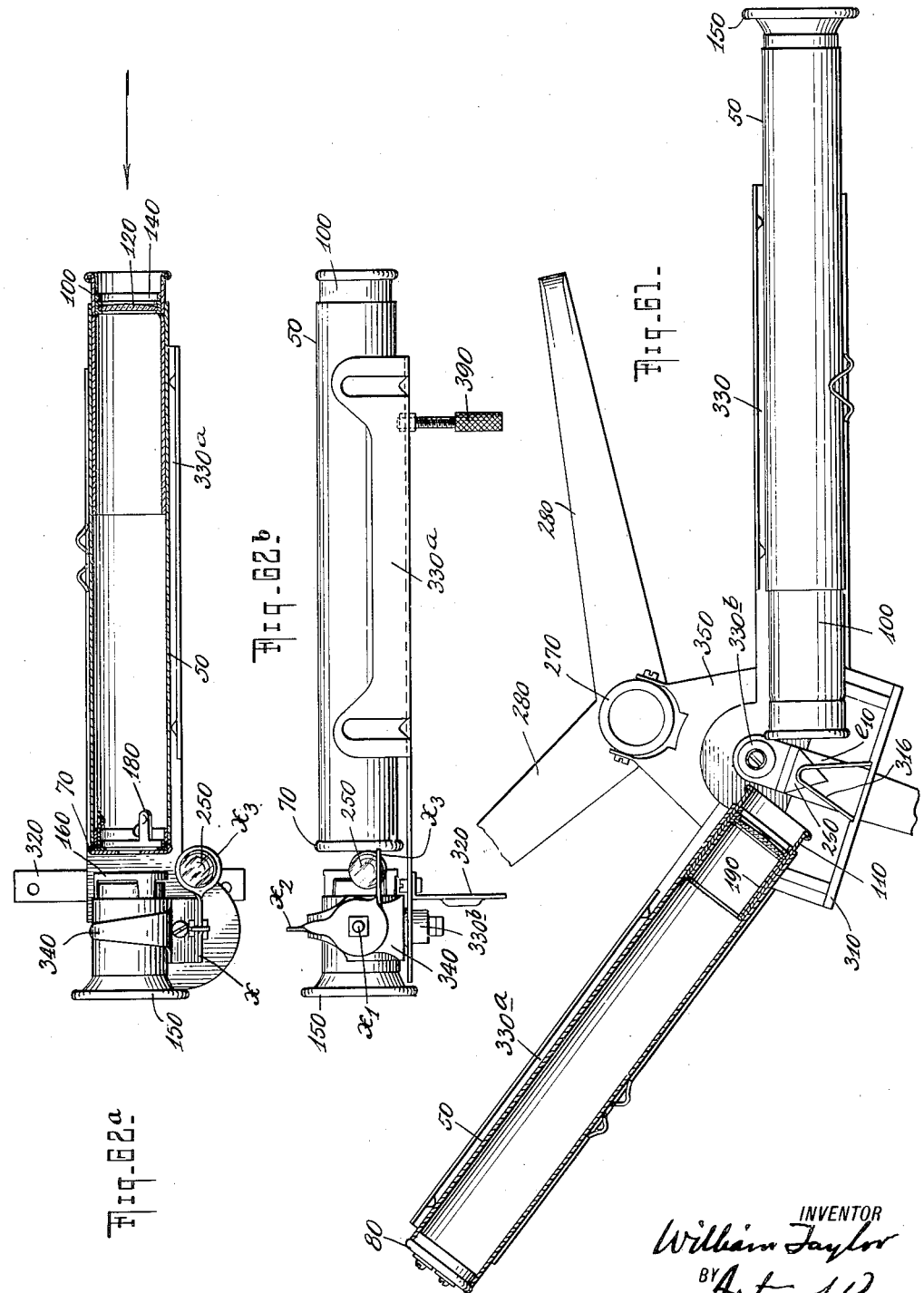

Patented Dec. 30, 1924.

1,521,339

UNITED STATES PATENT OFFICE.

WILLIAM TAYLOR, OF LEICESTER, ENGLAND.

OPTICAL APPARATUS FOR INSTRUCTIONAL PURPOSES.

Application filed November 2, 1922. Serial No. 598,527.

*To all whom it may concern:*

Be it known that I, WILLIAM TAYLOR, a subject of the King of Great Britain, residing at Leicester, in the county of Leicestershire, England, have invented certain new and useful Improvements in Optical Apparatus for Instructional Purposes, fully described and represented in the following specification and the accompanying drawings, forming a part of the same.

This invention relates to optical apparatus intended especially for instructional purposes, and the invention aims primarily to facilitate elementary education in the design, construction, properties, and use of optical instruments, by providing efficient apparatus for this purpose at a minimum of cost.

Heretofore separate and distinct optical instruments alone have been available, and the cost of a variety of these instruments sufficient for use in elementary instruction in optics has been so high that education in this science has been neglected.

The fundamental idea of the present invention is to provide a number of interchangeable optical and mechanical elements from which, in a simple way, a variety of different optical instruments can be built up. The making of elements thus adapted for use interchangeably in building a variety of optical instruments greatly reduces the cost in the provision of all such instruments.

Apparatus embodying the invention includes optical elements such as lenses and mirrors, and mechanical elements, all of such elements being so formed and so proportioned one to another that they may be detachably connected with one another in different combinations and relationships to form complete optical instruments of different kinds, that is, instruments in each of which the optical elements are so united and so protected from mechanical injury or disturbance and from the access of stray light that the instrument can be used in the same manner and under the same conditions as an ordinary optical instrument of the same kind. The instruments which may be built up from the elements of the apparatus include, in addition to magnifiers whose component parts are held in fixed relation to another during the use of the magnifier, a number of adjustable optical instruments, that is, instruments each of which has parts which, without disassembling the instrument, are movable relatively to each other for focusing the instrument or for adjusting the direction of its axis or for making any other adjustment usual in the use of an instrument of that kind.

In the form which is now believed to be most practical, the apparatus includes, first, a number of lens elements including both concave and convex lenses of various different focal lengths, tubular elements for interchangeably containing the lenses and protecting them from stray light, and interchangeable elements for detachably securing the lens elements in the tubular elements and for spacing them in various different ways in the tubular elements; second, optical elements other than lenses, such as mirrors and prisms; and third, interchangeable supporting and connecting elements providing means for mounting the tubular elements in various different relations to other tubular elements and to objects to be observed, and for mounting the optical elements other than lenses outside the tubes in various different relations thereto.

In order that the invention may be clearly understood, I will describe in detail approved apparatus embodying it, in connection with the accompanying drawings illustrating such apparatus. The description will cover first the various interchangeable elements of the apparatus, and second, a number of optical instruments which may be built up from these elements. In said drawings:—

Figs. 1ᵃ to 37 inclusive, all drawn upon the same scale, show the separate elements of the apparatus; and Figs. 38 to 63 inclusive show various optical instruments formed by combining these elements.

Figs. 1ᵃ, 1ᵇ and 1ᶜ show the large tube element 10 and the spring box element 40 mounted in one end thereof, Fig. 1ᵃ being an end elevation and Figs. 1ᵇ and 1ᶜ being side views showing the tube element sectioned on the lines *b—b* and *c—c* of Fig. 1ᵃ respectively;

Figs. 2ᵃ, 2ᵇ and 2ᶜ show the connecting sleeve element 20, Fig. 2ᵃ being an end elevation and Fig. 2$^b$ a side elevation, and Fig. 2$^c$ a top view;

Figs. 3$^a$ and 3$^b$ show the lens element 30, Fig. 3$^a$ being an axial section and Fig. 3$^b$ an end elevation;

Fig. 4 is an axial section of the lens element 30$^a$;

Figs. 5$^a$ and 5$^b$ show the tubular or sheath element 50, Fig. 5$^a$ being a side elevation and Fig. 5$^b$ an end elevation;

Fig. 6 is an axial section of the lens element 60;

Fig. 7 is an axial section of the lens element 60$^a$;

Figure 1B:
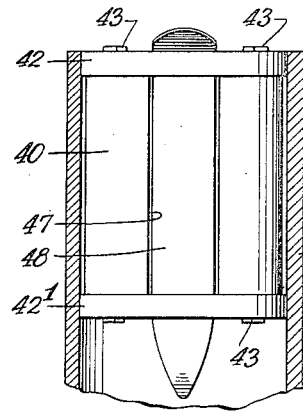
Figure 1B:
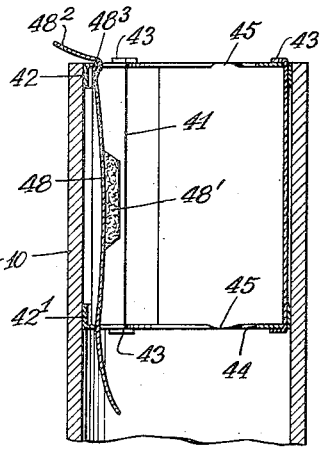
Figure 1B:
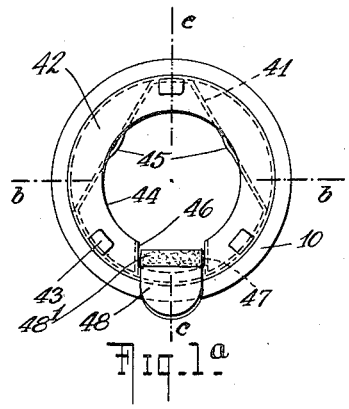
Figure 1B:
Figure 1C:

Figs. 8$^a$ and 8$^b$ show the peep-hole element 70, Fig. 8$^a$ being an end elevation and Fig. 8$^b$ being an axial section;

Figs. 9$^a$ and 9$^b$ show the slit element 80, Fig. 9$^a$ being an end elevation and Fig. 9$^b$ an axial section;

Figs. 10$^a$, 10$^b$, 10$^c$ and 10$^d$ show the liner elements 90, 100 and 110, Figs. 10$^a$ and 10$^b$ being respectively an end elevation and an axial section of the element 90, and Figs. 10$^c$ and 10$^d$ being respectively axial sections of the elements 100 and 110;

Figs. 11$^a$ and 11$^b$ show the lens element 120, Fig. 11$^a$ being an axial section and Fig. 11$^b$ being an end elevation;

Fig. 12 is an axial section of the lens element 130;

Figs. 13$^a$ and 13$^b$ show the spring retainer element 140, Fig. 13$^a$ being an end view and Fig. 13$^b$ a side view;

Fig. 14 is an axial section of the eye-cup element 150;

Figs. 15$^a$ and 15$^b$ show the cage element 160, Fig. 15$^a$ being an end view and Fig. 15$^b$ a side view;

Figs. 16$^a$ and 16$^b$ show the lens element 170, Fig. 16$^a$ being an axial section and Fig. 16$^b$ being an end view;

Figs. 17$^a$ and 17$^b$ show the cage element 180, Fig. 17$^a$ being an end view and Fig. 17$^b$ a side view;

Figs. 18$^a$, 18$^b$ and 18$^c$ show the spacer elements 190 and 190$^a$, Fig. 18$^a$ being an end view of either element and Figs. 18$^b$ and 18$^c$ being side views of the elements 190 and 190$^a$ respectively;

Figs. 19$^a$ and 19$^b$ show the glass disc element 200, Fig. 19$^a$ being an axial section and Fig. 19$^b$ an end view;

Figs. 20$^a$ and 20$^b$ show the three-mirror element 210, Fig. 20$^a$ being a side view and Fig. 20$^b$ an end view;

Figs. 21$^a$ and 21$^b$ show the mirror element 220, the figures being respectively side and front elevations;

Figs. 22$^a$ and 22$^b$ show the mirror element 230, Fig. 22$^a$ being a front elevation and Fig. 22$^b$ being a section on the line $b-b$ of Fig. 22$^a$;

Figs. 23$^a$ and 23$^b$ show the mirror element 240, Fig. 23$^a$ being a front elevation and Fig. 23$^b$ a section on the line $b-b$ of Fig. 23$^a$;

Fig. 24 is a view of the spherical mirror element 250;

Figs. 25$^a$ and 25$^b$ show the prism element 260, the figures being respectively end and side elevations;

Figs. 26$^a$, 26$^b$ and 26$^c$ show a tripod stand formed by the pillar element 270 and three-feet elements 280 and the stage element 350 attached to the pillar element, Fig. 26$^a$ being a top view, Fig. 26$^b$ a side view, and Fig. 26$^c$ a section on the line $c-c$ of Fig. 26$^b$.

Figs. 27$^a$, 27$^b$ and 27$^c$ show the swivel element 290, the figures being respectively a plan view, a front elevation, and a side elevation;

Figs. 28$^a$, 28$^b$ show the saddle and girth element 300, Fig. 28$^a$ being a plan view, and Fig. 28$^b$ being a section on the line $b-b$ of Fig. 28$^a$;

Figs. 29$^a$ and 29$^b$ show the cradle element 310, the figures being respectively an end and a perspective view;

Figs. 30$^a$, 30$^b$ and 30$^c$ show the bracket element 320, the figures being respectively a plan view, a front elevation and an end elevation;

Figs. 31$^a$, 31$^b$, 31$^c$ show the pivoted cradle elements 330 and 330$^a$, Fig. 31$^a$ being a plan view, Fig. 31$^b$ a fragmentary elevation, and Fig. 31$^c$ a fragmentary section on the line $c-c$ of Fig. 31$^a$;

Figs. 32$^a$, 32$^b$ and 32$^c$ show the spring clip element 340, the figures being respectively a plan view and an end view and a side view;

Figs. 33$^a$ and 33$^b$ show the link element 360, the figures being respectively a side view and an edge view;

Figs. 34$^a$ and 34$^b$ show the bridge element 370, the figures being respectively a side view and an edge view;

Figs. 35$^a$, 35$^b$ and 35$^c$ show the skew holder element 380, the figures being respectively a plan view, an end view, and a side view;

Fig. 36 is a side view of one of the screws and nuts by means of which the mechanical elements are secured together;

Fig. 37 is a side view of the stud and sleeve element 390;

Figs. 38 to 42 inclusive are axial sections of various types of magnifiers;

Figs. 43$^a$ and 43$^b$ show a microscope with a fixed vertical axis, the figures being respectively side and front elevations;

Figs. 44$^a$, 44$^b$ and 44$^c$ show a microscope whose axis may be inclined, the figures being respectively a plan and a side elevation of the microscope, and a plan view of a stop $c$ used therein;

Figs. 45 and 46 show a stand for mounting a small telescope (the feet of the stand being omitted), Fig. 45 being a side elevation and Fig. 46 being a fragmentary front elevation;

Figs. 47 to 50 inclusive are axial sections of various forms of small telescopes;

Fig. 51 is a plan view partly in section of an astronomical telescope and a small finder telescope mounted therewith;

Figs. 52ª and 52ᵇ show the elements for mounting and adjusting the finder telescope shown in Fig. 51, Fig. 52ª being an end elevation and Fig. 52ᵇ a front elevation;

Fig. 53 is an axial section of an eye piece system which may be used in an astronomical telescope;

Fig. 54 is an axial section of a camera;

Fig. 55 is an axial section of a telephoto camera;

Fig. 56 is an axial section of a kaleidoscope;

Fig. 57 is a side elevation of a simple periscope;

Fig. 58 is an axial section of a submarine type of periscope;

Fig. 59 is an axial section of the optical system of a camera obscura;

Fig. 60 is a plan view of a sextant mounted on a stand;

Fig. 61 is a plan view of a spectroscope mounted on a stand;

Figs. 62ª, 62ᵇ show a heliograph, the figures being respectively a plan and an elevation; and Fig. 63 is a plan view of a binocular telescope.

*The lens elements, the tubular elements, and the elements for detachably mounting the lenses in the tubes.*

Each of these elements is provided with an internal or external cylindrical surface adapted to fit interchangeably within or over the cylindrical surface of other elements. Some of the elements, particularly those which are tubular in form, are provided with both external and internal cylindrical surfaces for fitting other elements. In constructing the elements, the external cylindrical surfaces and the internal cylindrical surfaces of different elements which fit together are made of the same nominal size, but a tolerance is allowed for variations likely to occur in workmanship. This tolerance is minus in the case of external cylindrical surfaces and plus in the case of internal cylindrical surfaces. This general principle is followed throughout the elements to be described, except that it is modified somewhat, as hereinafter noted, in the case of elements capable of expansion and contraction.

Although the surfaces of these elements which fit together are shown in the drawings as cylindrical, the short cylindrical edges of the lens elements, and other similar elements hereinafter described, may be bevelled or made part spherical for greater facility in placing them within other elements. It should be understood that all such modified forms are hereinafter included in the term "cylindrical."

Two principal tubular elements are provided in the apparatus, a large tube 10 and a small tube or sheath 50. In the particular apparatus illustrated, these tubular elements serve both as holding elements for containing and supporting lenses and other optical elements and as shrouding elements to protect the optical elements contained therein from the access of stray light.

The large tube element 10, (shown in Figs. 1ª, 1ᵇ, 1ᶜ,) may conveniently be constructed of cardboard and is about 19 inches long. I usually provide more than one of these tubes, and in order to join two such tubes endwise, a connecting sleeve element 20 is provided.

Figure 2B:
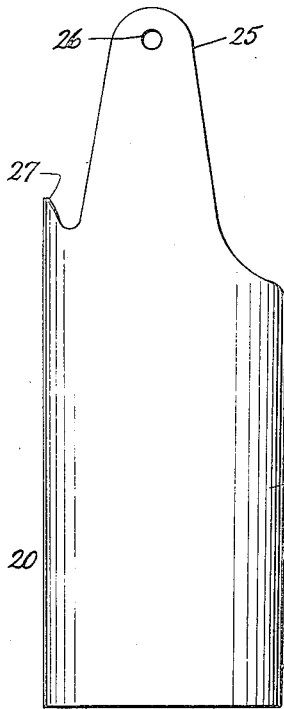
Figure 2C:
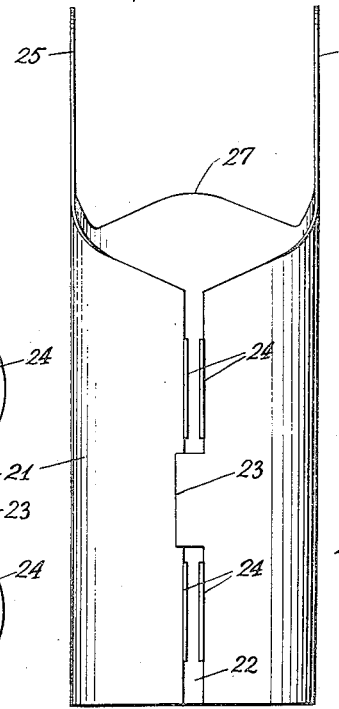
Figure 2A:
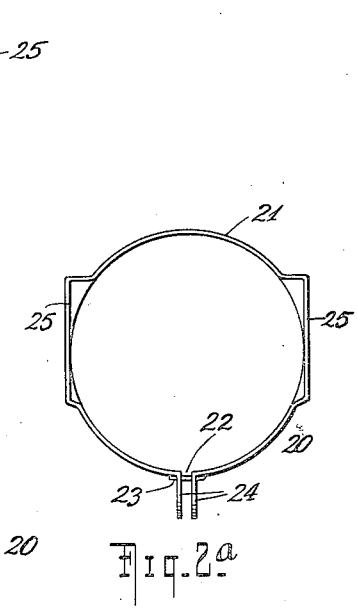

The sleeve element 20 (shown in Figs. 2ª, 2ᵇ, 2ᶜ) is stamped from sheet metal and has a cylindrical body 21 with a joint 22, one edge of which has an extension 23, adapted to overlap the other edge and exclude light, and four upturned lugs 24, adapted for closing together by screws and nuts, whereby the sleeve may be attached to either end of the tube element 10, so that it may be used to unite the ends of two such tubes, as hereafter shown. The sleeve element 20 may be used also for mounting a mirror at one end of a tube element 10. To provide for this use of the element, the body 21 has two parallel lugs 25 extending lengthwise at one end and pierced with holes 26, on an axis crossing that of the body 21 at right angles, and a projection 27.

There are two lens elements, 30 and 30ª adapted to fit interchangeably into either end of a tube element 10. The element 30 (Figs. 3ª and 3ᵇ) consists of a plano-convex lens and its mounting. The lens 31 is fitted removably within a cup-shaped stamping of metal 32, and retained by a ring 33 adapted to be sprung into said stamping. The stamping 32 is adapted to fit in one end of the tube element 10 and has an outwardly projecting flange 34 adapted to abut against the end of said element so as to position the element 30 squarely therein, and also adapted to be held within the sleeve element 20. The element 30ª (Fig. 4) is similar to the element 30 except that its lens 31ª is achromatic.

The other lens elements included in the apparatus do not fit directly in the large tube 10, but may be mounted by various means in the smaller tube or sheath 50, while the sheath itself may be mounted centrally in either end of the large tube 10 by means of a spring box element 40.

The spring box element 40 (shown in one end of the tube 10 in Figs. 1ª, 1ᵇ, 1ᶜ) is formed of sheet metal in three parts, the centre portion 41 being united to the two cup stampings 42, 42¹, by means of lugs 43 passing through and bent over the edges of holes in the cups. The cups have central apertures 44 adapted to receive the sheath 50 freely, and the part 41 has at each end two lugs 45 formed into little raised bosses which lie within the apertures of the cups and form isolated points of bearing for the sheath. A notch 46 in each cup, in line with the space 47 between the inturned edges of the centre part 41 and symmetrically opposite the lugs 45, accommodates the bow-shaped spring 48, which is stamped from sheet metal and has on the outer face of the bow a facing 48¹ of felt or the like adapted to press upon the sheath to urge it against its bearings 45 and to hold it frictionally, as shown in Fig. 53, one end of the bow being pointed to enter, and adapted to seat against the bottom of, the notch 46 in one of the cups, the other end being bent to form a finger-piece 48² by which the spring may be pushed in or withdrawn, and a notch 48³ which, when the spring is in place in the spring box, engages the other of the cups at the bottom of the notch 46 so as to secure the spring in place longitudinally. The outer peripheral edges of the cups are adapted to fit securely within the tube 10.

The smaller tube or sheath element 50 (Figs. 5ª and 5ᵇ) is formed of a piece of sheet metal having one of its edges 51 raised and closely overlapping the other, 52, so as to exclude light. Preferably these edges are united, for example by welding, for about the middle third of the length of the tube, while their other parts are left free for elastic movement. The internal diameter of said middle third of the tube is given a tolerance which is plus with respect to the nominal size, which is preferably one inch, but the ends being free spring somewhat so as to hold frictionally other constructional elements which are adapted to fit interchangeably therein.

Two lens elements, 60 and 60ª, may be mounted directly in either end of the sheath element 50. The element 60 (Fig. 6) consists of an objective preferably achromatic mounted between two sheet metal stampings, its cylindrical periphery 62 being adapted to fit interchangeably in either end of the sheath element 50 and having an outwardly projecting flange 63 adapted to abut against the end of said sheath element so as to position the lens squarely therein. In order that the objective may serve for use alternatively as either a wet or dry microscope objective, we leave the spherical aberration of the dry lens under-corrected to such slight extent that the same objective, when used as an immersion lens, becomes over-corrected to an approximately equal slight extent. The element 60ª (Fig. 7) consists of an achromatic objective and its mounting, of higher power than that of the element 60.

A peep-hole element 70 may also be mounted directly in either end of the sheath element 50. The element 70 (Figs. 8ª and 8ᵇ) consists of a flanged cup-shaped stamping 71 having a central peep-hole 72, through which an observer may see an object or image. A slit member 80 (Figs. 9ª and 9ᵇ) may be formed by attaching to the peep-hole element 70 two duplicate plates 81, by means of screws and nuts 82, passing through holes 73, 74 in the element 70, so that the distance between the contiguous straight edges of the plates 81 may be adjustably set.

There are a number of lens elements which may be detachably mounted in various different positions within the sheath element 50. These lens elements are, however, mounted, not directly in the sheath, but in tubular elements which are slightly smaller than the sheath so that they fit into it. These tubular elements are the liner elements 90, 100, 110, and the eyecup element 150.

The liner elements 90, 100, 110 (Figs. 10ª, 10ᵇ, 10ᶜ, 10ᵈ), are all stamped from sheet metal in the form of tubes with an open longitudinal joint 91, the outer diameter of the tubes being given a minus tolerance when the joint is closed, while the inner diameter is given a plus tolerance. The element 90 is adapted for joining together two sheath elements 50 and has a central rib 92 to abut against the ends of such sheaths. Two internal abutments 93, 94, formed by pressing are adapted to position optical elements as hereinafter shown. The elements 100 and 110 are adapted for sliding into either end of the sheath element 50, generally for the purpose of focussing, and have their outer ends 101 and 111 curled and wired to facilitate grasping by the fingers. The element 100 has an internal rib 102 and three equi-distant abutments 103 adapted to position optical elements. The element 110 has an internal flange or abutment 112.

There are two lens elements 120 and 130 which fit directly inside the liner elements. The element 120 (Figs. 11ª, 11ᵇ) includes a plano-convex lens 121. The lens 121 may be adapted for fitting directly into the liner elements 90, 100, or 110, or its peripheral edge may be protected by a rim 122 of metal, preferably a soft metal or alloy, for example of lead and tin, which may be closed upon it by pressure. The external diameter of the rim 122 is such that the element 120 fits directly into the liner elements. The element 130 (Fig. 12) comprises a negative or concave lens 131 which is mounted between two metal stampings 132, 133 preferably clinched together. The cylindrical periphery of the mounting is such that the element is adapted to fit interchangeably into any of the liner elements.

To retain these lens elements, and particularly element 120 in position within any of the liner elements 90, 100, 110, spring retainer elements 140 are provided.

The spring retainer element 140 (Figs. 13ª, 13ᵇ) is formed by bending a narrow strip of sheet metal or a wire into circular form with an open joint. This element is adapted to retain optical elements within the liner elements by being inserted in the manner hereafter shown, and, for this purpose, is so constructed that, when the butt joint is closed, the outer diameter has a minus tolerance, but when the ring is normally free, the butt joint becomes opened and the outer diameter then has a plus tolerance.

The eyecup element 150 (Fig. 14) is formed from sheet metal and comprises a trumpet-shaped portion 151 about 1½ inch diameter, and a tubular portion 152 which is adapted to fit interchangeably within the sheath element 50. It has an internal stop or abutment 153.

The lens elements 170, which are used in the eyecup do not fit directly into it, but are mounted in the eyecup by means of cage elements 160.

The cage element 160 (Figs. 15ª, 15ᵇ) consists of a cup-shaped metal stamping 161 having a central aperture 162 and three spring bars 163 adapted to be sprung into and fit within the eyecup element 150.

The lens element 170 (Figs. 16ª, 16ᵇ) may be seated in the cage element 160. This element 170 comprises a plano-convex lens 171 mounted by enclosing it between two annular metal stampings 172, 173, having cylindrical portions fitting the one within the other and clinched together; preferably by bending the edges of the outer stamping 172 inwards, for example at three equi-distant places, 174, 175, 176. The element 170 is adapted to fit closely but freely within the cage element 160.

In order to provide for positioning a number of lens elements 170 in the eyecup 150 in proper relation to each other, or to the object or image to be observed, the cage element 180 and the spacer elements 190 and 190ª are provided.

The cage element 180 (Figs. 17ª, 17ᵇ) is similar to the cage element 160, and like it adapted to fit within the eyecup element 150. The element 180 has, however, on each of its bars 183 a projection 184, slightly dome-shaped, formed by pressing the metal from without, and adapted to be sprung over the part 161 of the cage element 160, and a lateral projection 185 bent inwardly so as to form an abutment to position the annular end 181 of the element 180, as shown in Fig. 49 for example, at a predetermined distance from the end of the element 160 to which it is attached, this distance being such, for example, that the element 170, when placed in the cage 160, is in focus in the plane of the aperture 182 of the element 180. The plate forming the end of the element 180 may be pierced with four small holes 186, in which cross-wires 187 may be secured for sighting or positioning the image of an object.

The spacer elements 190 and 190ª (Figs. 18ª, 18ᵇ, 18ᶜ) have the form of cylindrical tubes bent from sheet metal, with their edges unjointed, and differ only as to length, their outer diameter being adapted for fitting within other elements such as the cage element 160 and the liner elements 90, 100, 110. The lengths of these spacers are adapted for suitably spacing two different lens elements 170, and, for this purpose, spacers of different lengths are provided.

In the above description of the elements which fit within the sheath element 50 the usual manner of combining these elements has been described. It should be noted, however, that as the internal diameter of the liner elements 90, 100, 110, and the internal diameter of the eyecup element 150 are substantially the same, the lens elements 120, 130 may be fitted directly within the eyecup instead of within the liners, and conversely lens elements 170, when mounted in cage elements 160, may be fitted into any one of the liners instead of into the eyecup. Furthermore, the spacing cage 180 and spacer elements 190, 190ª, fit into any of the liners as well as into the eyecup.

In general I give the lenses of elements 30, 120 and 170 plano-convex form, but do not limit myself to this form. These lenses and the lens of element 130 I prefer to make of ordinary rolled plate glass.

The focal length of certain of the lens elements which have been described most desirably bear a definite relationship to each other. The lenses of the elements 170 and 120 respectively have focal lengths of 1¾ and 7 units, preferably inches, respectively, or approximately in such ratio that, by combining two elements 170 there is produced a lens of about ⅞ of a unit focal length, and, by combining two elements 120, there is produced a lens of about 3½ units focal length, whereby it is possible to obtain lenses whose focal lengths vary in geometrical progression, namely, ⅞, 1¾, 3½ and 7, such a series being well adapted for constructing most optical instruments in the simplest manner. The lens element 60 is most desirably of about 1¼ units focal length, and the element 60ª of about ⅝ of a unit focal length, so that they fit as secondary or intermediate elements in the above geometrical series. The focal length of the large lens elements 30 and 30$^a$ is made considerably greater than that of the other positive lens elements, and is preferably about 40 units so that it lies in the said secondary series.

*Optical elements other than lenses.*

The other optical elements which are provided are, for the most part, used outside the tubes instead of being placed within the tubes like the lens elements. Certain of them are, however, adapted for use either within or without the tubes.

The glass disc elements 200 and 200$^a$ (Figs. 19$^a$, 19$^b$) may be used either within the sheath 50 or outside of it. These two elements are similar except that the glass of the element 200 is polished on both faces, while the glass of the element 200$^a$ is polished on one face and ground on the other. The peripheral edges of the discs are most desirably encased in a soft metal rim similar to the rim 122 of the lens element 120. The outside diameter of this rim is such that the disc elements fit within the liner elements 90, 100, 110. The disc elements may also be mounted outside the sheath element by means hereinafter described.

The optical element 210 is used within the sheath 50. This element 210 (Figs. 20$^a$, 20$^b$) comprises a group of three mirrors consisting of three strips of polished glass 211, 212, 213 blackened at their outer surfaces and held together by means of a paper bandage 214, wrapped around it, and fastened with glue or the like. This element is adapted to fit closely within the liner element 100. When the element 210 is thus inserted in the liner element 100, its three corners pass between the spaced internal abutments 103 of the liner element 100.

There are three mirror elements 220, 230 and 240 adapted to be used outside the tubes.

The element 220 (Figs. 21$^a$, 21$^b$) comprises a small mirror and its mounting. The mirror 221, preferably of glass silvered at the back, is held and protected by a mounting 222 of sheet lead or the like plastic material, having its edges bent at 224, 225, 226, to secure the mirror, and having a tongue 227 whereby it may be attached to one of the supporting elements hereinafter described by means of a screw through the hole 228, the tongue 227 being sufficiently flexible to permit of setting the mirror at various angles.

The element 230 (Figs. 22$^a$, 22$^b$) comprises a large mirror and its mounting. The mirror 231 is mounted in a recess 233 in a sheet metal stamping 232 being retained therein by tongues 234, 234$^1$, 234$^{11}$, pierced and bent from the metal, against which the mirror is lightly urged by an elastic pad of felt or the like 235 placed in the recess 233 behind the mirror. Preferably the recess is sufficiently deep to accommodate the mirror and the felt freely except at three points 236, 236$^1$, 236$^{11}$, opposite the tongues 234, 234$^1$, 234$^{11}$, respectively, so that the mirror is constrained chiefly at these three points in such a manner that it cannot be warped by bending. The stamping 232 where it surrounds the mirror at three sides is flat and pierced with three holes, 237, 237$^1$, 237$^{11}$, adapted for securing it by means of screws to supporting elements hereafter described. At its fourth side the stamping is cut away to expose the edge 238 of the mirror so that an object seen in the mirror may be aligned with an object beyond the mirror.

The element 240 (Figs. 23$^a$, 23$^b$) comprises a still larger mirror and its mounting. The mirror 241 is mounted in a sheet metal stamping 242 in the manner just described, but the stamping surrounds and protects all the edges of the mirror and has lugs, 243, 244, bent in parallel planes at right angles to the surface of the mirror and pierced by holes 245, whereby the element may be pivotally attached by means of screws to various other elements. Thus, for example, the mirror element 240 may be pivotally mounted at one end of the tube element 10 by means of the sleeve element 20, which has been described. To mount the mirror element in this way a bolt is passed through the holes 26 in the lugs 25 of the sleeve 20 and through the holes 245 in lugs 243, 244 of the mirror element. When the mirror element 240 is so mounted it engages the projection 27 of the sleeve 20 and is retained by this projection in a plane at an angle of 45° to the axis of the sleeve 20 and the axis of the tube element 10 on which the sleeve is mounted.

The element 250 (Fig. 24) is a small spherical mirror which may be a polished steel ball, such as is used for ball bearings, or a glass ball or bubble silvered internally.

The element 260 (Figs. 25$^a$, 25$^b$) is an equilateral glass prism of which the surfaces 261, 262 are polished and the surface 263 is generally smoothly ground, but, for some purposes may be polished.

*Supporting and connecting elements.*

A number of interchangeable mechanical elements are provided for supporting and connecting both the large and small tubes, as well as the optical elements which are used outside the tubes, in numerous different relations to themselves and to other objects.

The pillar element 270 (Figs. 26$^a$, 26$^b$) comprises a cylindrical tube formed of sheet metal with its edges abutting at 271 and having ends 272, 273 curled respectively inwardly and outwardly around wire rings so as to stiffen the tube, especially against torsional stress. The pillar is provided with various holes, such as 274, for the attachment, interchangeably by means of screws and nuts, of various supporting elements hereinafter described. An opening 275 is formed in one side of the pillar 270 to give access to nuts or screws which may be placed inside the pillar and to permit light, for example, an electric lamp placed within the pillar, to shine upon an object. The external diameter of the pillar is about the same as the external diameter of the tube or sheath 50. This permits a number of attachment elements hereinafter described to be applied interchangeably either to the sheath or the pillar.

In order to form a tripod stand, the feet elements 280 are provided. These feet may be secured by screws and nuts to one end of the pillar element 270 as shown in Figs. 26$^a$, 26$^b$. These feet are formed by stamping of sheet metal, are of U section, as shown in Fig. 26$^c$, and tapering, and rest upon dome-shaped pads 281. It will be seen that the weight of the pillar and any instrument it supports puts a tensional stress on each foot at its free edges 282, which, being straight, afford maximum resistance to such tension, while the upper edges, being curved in transverse section as shown in Fig. 26$^c$, are well adapted to receive the compression stress.

To provide for mounting either the large tube 10, or the sheath 50, or another pillar 270, on the tripod stand formed by the pillar 270 and the feet 280, in such manner that these tubular elements may be adjusted both as to altitude and azimuth, the swivel element 290, the saddle and girth element 300, the cradle element 310, and the bracket element 320 are provided. Several of these elements may, however, be used for mounting the tubes in other relations as hereinafter explained.

The swivel element 290 (Figs. 27$^a$, 27$^b$, 27$^c$) is adapted to be detachably applied to the pillar 270 in such maner that it may be adjusted about the axis of the pillar, and it is formed so that other elements may be detachably fastened to it in such manner that they are adjustable about an axis perpendicular to the axis of the pillar 270 on which it is mounted.

The swivel element 290 is formed by pressing from sheet metal, and comprises a plate 291 having an embossed annulus 291$^1$ which both stiffens the plate and forms a seating against which other elements may be rotatably mounted. A stud 292 with countersunk head is fixed to the plate in the middle of the annulus to engage with a button-hole slot formed in the element to be so mounted. A part 294 of the plate 291 is bent over at right-angles and has a conical boss 295 formed by pressing and adapted to seat rotatably in the top of the tubular pillar element 270. Another part 296 of the plate 291 is bent over in a plane parallel with that of the part 294, and is pierced with a hole 297 adapted to encircle the said pillar element 270, and preferably to bear upon it at two points, 298, 298$^1$, while the outer edge 299 of the part 296 is further bent so as to engage the said pillar by elastic pressure, to urge the pillar into contact with the points 298 and 298$^1$ and to secure sufficient friction to hold the swivel in any position to which it may be turned on the pillar. The swivel and pillar elements are shown together in Figs. 45 and 46.

The saddle and girth element 300 (Figs. 28$^a$, 28$^b$) provides means for mounting the large tube 10 on the swivel element 290. This element 300 is formed from sheet metal. The saddle comprises a plate 301 having a central button-hole slot 302 and two transverse ribs 303 adapted for engagement with the swivel element 290 and so placed that they bear at three points, 304, 304$^1$, 304$^2$, on the annulus 291$^1$ of the swivel. The ends 305, 305$^1$, are bent at right-angles to the plate 301, and their edges curved so as to fit upon the tube element 10, while the edges 306, 306$^1$, are also turned at right-angles to the plate 301 so as to stiffen it against longitudinal bending. Two holes 307 are provided in recesses sunk in the plate 301 for screws whereby the ends of the girth 308 may be attached and tightened, the girth being adapted to encircle the said tube element 10 so as to attach the saddle securely thereto, and holes 309, 309$^1$, in seatings 309$^a$, 309$^{1a}$, are provided for attachment of other elements as hereinafter described.

The cradle element 310 (Figs. 29$^a$, 29$^b$) is adapted to hold the small tube or sheath 50. When used with the bracket element 320, the cradle affords means for mounting the sheath upon the swivel element 290. Alternatively, the cradle may be used to mount a pillar element 270 upon other elements. The cradle element has the form of an angle-plate 311 stamped from sheet metal with ribs 312, 312$^1$, embossed thereon so as to stiffen it and form four points of bearing whereon the tubular sheath element 50 may be seated as shown, for example, in Figs. 43$^a$, 43$^b$. The edge 313 of the angle plate is curled to stiffen it and to provide housings for portions of a bent wire spring 314 whose two ends 315, 315$^1$ pass through holes in the ends of the ribs 312, 312$^1$, respectively, and whose middle part 316 is adapted to press upon and urge the said sheath element toward its seatings in the cradle element. Four holes, 317, 317$^1$, 317$^2$, 317$^3$, are provided for attachment of the element, by means of screws and nuts, to other elements, as hereafter shown. A button-hole slot 318 is pierced through the cradle for attachment thereto of the stud 292 of the swivel element 290, and a longitudinal rib 319 is embossed outwardly on the cradle in such position that it forms two of three approximately equi-distant points of bearing on the annulus 291¹ of the said swivel element, the third point of bearing being provided by attaching to the cradle the bracket element 320.

The bracket element 320 (Figs. 30ª, 30ᵇ, 30ᶜ) is stamped from sheet metal and pierced with holes 321, 322, 323, 324, 325, 326, 327, for attachment to other elements, as hereinafter described, and a raised seating 328 adapted, as aforesaid, to form the third point of bearing on the annulus 291¹ of the swivel element 290, when the bracket element is attached to the cradle element 310 as shown in Figs. 45 and 46.

It will be understood that the tube-supporting elements 300 and 310 which have been described, and both of which are provided with various screw-holes, may be used, independently of the swivel element 290, to mount the large tube 10, the small tube or sheath 50, or a pillar element 270, directly upon other parts of the apparatus, as, for instance, upon a pillar element 270 forming part of a tripod stand. In addition, the apparatus includes other tube-supporting elements which are used, independently of the swivel element, to mount the tubes in various different relationships. These elements include two cradle elements 330 and 330ª and a spring clip element 340.

The two cradle elements 330, 330ª (Figs. 31ª, 31ᵇ, 31ᶜ) have the characteristics of the cradle element 310 and, in addition, ends 331, 331ª, right and left-hand respectively, adapted to be placed one over the other and joined together by a pivot 330ᵇ in holes 332, so that the cradles may be adjustably inclined to one another. Each cradle is provided with a measuring point 333, by measuring the separation of which the angle of the mutual inclination of the cradle elements may be determined by reference to a table of separation and corresponding angles, which may be provided for use with the apparatus. Each cradle is provided with two sights, 334, 335, in a plane which includes their pivot axis 336, whereby objects may be sighted and the angles subtended by them determined. Each cradle has holes 337, 337¹, 337², 337³, 337⁴, for attachment of other elements by means of screws and nuts.

The clip element 340 (Figs. 32ª, 32ᵇ, 32ᶜ) is formed of sheet metal, in one piece, and comprises portions 341, 342, at right-angles to one another and pierced with holes 343, 344, for attachment to other elements, portions 345 and 346 forming together a V-shaped seating in which the sheath element 50 may be seated, and an elastic tongue-shaped portion 347 adapted to press upon the sheath element so as to hold it to said seating. Alternatively, the clip element may be applied to the pillar element 270 and may be used either to mount a pillar element upon other elements or to secure other elements to a pillar element which is used as part of a tripod stand.

The apparatus includes other structural elements which do not fit directly upon any of the tubes, but which may be used in many different relations for supporting or attaching together either the tube-supporting elements or the optical elements which are used outside the tubes. Such elements include the stage element 350, the link element 360, the bridge element 370, as well as the bracket element 320, which has already been described.

The stage element 350 (Figs. 26ª, 26ᵇ) may be secured to the pillar element 270 and used as a support for the supporting elements, or optical elements used without a tube, or as a support for objects to be observed. This element is formed of sheet metal and has a plane upper surface 351 with an aperture 352, and edges 353 bent downwards both to stiffen it and to form two brackets 354 pierced with holes for insertion of screws by which it is attached rigidly to the pillar. The stage element is shown attached in position for building a microscope, but can be attached in other positions as will be hereinafter described.

The link element 360 (Figs. 33ª, 33ᵇ) is a flat strip of sheet metal provided with holes 361 for the attachment of other elements.

The bridge element 370 (Figs. 34ª, 34ᵇ) is stamped from sheet metal and has holes 371 for the attachment of other elements.

In order to support either of the glass disc elements 200, 200ª, or one of the lens elements, independently of the tubes, the skew holder element 380 (Figs. 35ª, 35ᵇ, 35ᶜ) is provided. This element is formed of sheet metal and has two portions, 381, 382, bent in planes at right-angles to one another, the portion 381 being slit to form two outer fingers 383, 384, and a middle finger 385, which is sufficiently elastic and so stepped upwards as to hold between the three fingers any disc-shaped element, such as the glass disc element 200. The portion 382 is offset from the portion 381 at about 45°, as shown, and is provided with a hole 386 for attachment to other elements.

Fig. 36 shows the type of screw and nut which is included in the apparatus for detachably uniting the various interchangeable mechanical elements which have been described. It should be noted that the screw-holes with which the various supporting elements are provided are of uniform size, so that only one size of screw and nut need be provided in the apparatus.

The element 390, shown in Fig. 37, comprises a screw of the same size and having the same thread as that shown in Fig. 36 and an internally threaded sleeve having a knurled outer surface. This element is used for uniting various constructional elements in cases where an adjustable connection between two such elements is desired.

I have now described all the types of elements necessary to make up a specific apparatus embodying the invention. It will, of course, be understood from the above description that a complete apparatus embodies more than one of many of the types of elements which have been described.

In describing the elements, I have described also the manner in which they are combined in building up optical instruments. In order that the combinations which may be formed by these elements may be still more clearly understood, I will now describe a number of different optical instruments which may be built up by combining the elements in various ways. Such instruments are illustrated in Figs. 38 to 63 of the drawings, and as in these figures each element forming part of the instrument is identified by the same reference number as has been used in describing that element, the manner of building up the instrument will be for the most part apparent from the drawings.

Figs. 38 to 42 inclusive show various forms of eyepiece and magnifier. Fig. 38 shows a Ramsden eyepiece of power X7, fitted with crosswires, which is built up by placing within the eyecup element 150 the following elements in the order stated:— A cage element 160, a lens element 170 within the cage, a spacer element 190 also within the cage, a lens element 170 at the end of the spacer element, a second cage element 160 with its bars between those of the other cage element, a cage element 180 carrying crosswires and sprung over and abutting against the end of the last named cage element 160 in manner already described. Fig. 39 shows a Ramsden eyepiece of power X9 which is built up similarly to the eyepiece shown in Fig. 38 except that the cage element 180 is omitted and, for the spacer element 190, is substituted a shorter spacer element 190$^a$. Fig. 40 shows a hand magnifier of power X12 which is built up of the same elements composing the eyepiece shown in Fig. 39, but the short spacer element 190$^a$ is inserted after the second cage element 160 so that the two lens elements 170 are close together. The principal focus of this eyepiece lies in the plane of the end $a$ of the last mentioned second cage element. Fig. 41 shows a magnifier or eyepiece of power X12, in which the focal plane is beyond the eyecup and which is built up in the same manner as the eyepiece shown in Fig. 40 except that the elements contained within the eyecup element 150 are placed therein in the reverse order. Fig. 42 shows a magnifier of power X6 with its focal plane at $b$ so that the magnifier may be stood upon the object to be examined and light may reach the object between the bars 163 of the cage element 160. This eyepiece is built up similarly to that shown in Fig. 39, except that the second lens element 170 is omitted and the second cage element 160 is placed in the eyecup in reverse position.

Figs. 43$^a$, 43$^b$ show a microscope with fixed vertical axis. Incidentally the glass disc element 200 is shown adapted for use as a vertical illuminator. The eyepiece contained in the eyecup element 150 may be built up alternatively in any of the forms shown in Figs. 38 to 42, and the objective element 60$^a$ may be used in lieu of the element 60 shown. Focussing motion is obtained by sliding the sheath element 50 in the cradle element 310. The manner of attachment of the various elements will be apparent from the drawings.

Figs. 44$^a$, 44$^b$ show a microscope whose axis may be variably inclined. Incidentally the glass disc element 200 is shown adapted for use as a camera lucida, and the two elements 170 are shown adapted for use as a substage condenser, or in combination with a special stop $c$, as a dark field illuminator. A plan view of the stop $c$ is shown at Fig. 44$^c$, and the end of the pillar and its three feet are omitted from that element 270 which carries the stage element 350 from the bracket element 320. Any of the eyepieces or objectives referred to in connection with Figs. 43$^a$, 43$^b$ may be used in this microscope, and the prism element 260 may be used as a reflector instead of the mirror element 220, and, for this purpose, its three principal surfaces may all be polished.

Figs. 45 to 50, inclusive, show various forms of small telescope and a stand whereon any one of them may be held adjustably in altitude and azimuth. The stand, which is shown in Figs. 45 and 46, is built exactly as is the stand of the microscope shown in Figs. 44$^a$, 44$^b$, except that the stage element 350, its supporting pillar element 270, and one of the bracket elements 320, are omitted. Parts of the stand are for compactness omitted from Figs. 45, 46, these being, however, sufficiently shown in Figs. 44$^a$, 44$^b$. In Fig. 47 is shown a Galilean telescope of power X6; in Fig. 48, a Galilean telescope of power X3; in Fig. 49, a reading telescope of power X7 with Ramsden eyepiece, in which the cage element 180 is used as a diaphragm; and in Fig. 50, an astronomical telescope of power X5.

Fig. 51 shows an astronomical telescope adapted for mounting upon the stand 270, 280 adjustably in altitude and azimuth, and having a finder telescope attached to it; and Figs 52$^a$, 52$^b$ show the arrangement of the elements used for mounting and adjustment of the finder telescope. Fig. 53 shows an arrangement of Ramsden eyepiece and erecting system, which may be used alternatively in the larger telescope. Instead of the objective element 30 shown, the element 30$^a$ may be employed, and instead of the eyepiece shown in Fig. 53, any of the eyepieces shown in Figs. 38 to 42 may be used. By varying the position of the elements 170 of the erecting system shown in Fig. 53, the power of the system may be varied continuously between X35 and X55. The finder telescope shown in Fig. 51 is preferably arranged like that shown in Fig. 50 with the addition to the cage element 180 therein of the crosswires as shown in Fig. 17$^a$. Adjustment of the finder telescope, so that its axis is parallel to that of the larger telescope, is obtained as shown in Figs. 52$^a$, 52$^b$ by means of two stud elements 390 working in their respective nuts $d$, $d$, housed in open slots formed in a special sheet metal stamping $g$, screwed to the cradle element 310, having housings $f$, $f$, formed by curling the sheet metal so as to guide the stud elements 390 axially. The cradle 310 is screwed to the bridge element 370 which is screwed to the saddle element 300 upon the seatings 309$^a$, 309$^{1a}$, which for this purpose are so inclined that the cradle element 310 is tilted at the other end toward the saddle element 300, as shown in the front elevation, and is also inclined to the saddle element 300 as shown in the end elevation. The bridge element 370 is sufficiently elastic to permit the cradle element to be lifted at its other end by the operation of that stud element 390 which bears upon the saddle element 300, while advance of the other stud element operates, against the resistance of the spring 314 of the cradle element 310, to displace the sheath element 50 from the point $i$ of its four points of seating in said cradle element, and, by this means, the axis of the finder telescope may be adjustably set parallel to the axis of the larger telescope.

Fig. 54 shows a simple form of camera in which the element 120 is the objective and the element 200$^a$ the focussing screen, and Fig. 55 shows a similar camera in which the element 130 serves as a telescope lens to increase the focal length of the system about three times. Focussing is obtained in either of these cameras by moving the element 100 lengthwise in the element 50, and photographs may be obtained by replacing the element 200$^a$ by suitable sensitive plates or films, or by the element 200, on which sensitive films may be supported. Such sensitive films may be protected from extraneous light by means of a disc of black paper or the like placed next below the retaining element 140. Either of these cameras may be supported on the stand element 270, 280 by means of the cradle element 310, for example, as in the microscope, Figs. 43$^a$, 43$^b$ or 44$^a$, 44$^b$, and the objective element 120, Fig. 54, may be replaced by the objective element 60 to form a microscope camera.

Fig. 56 shows a kaleidoscope in which the elements 200 and 200$^a$ form between them a chamber for the objects which may be pieces of broken colored glasses, wire, etc., and which the operator may change at will by removal of the element 200$^a$.

Fig. 57 shows a simple periscope in which the mirror element 230 is supported from the clip element 340 by means of two special sheet metal brackets $k$, $k^1$ attached thereto by means of screws. The sheath element 50 is carried in the tube element 10 by means of the spring box element 40 in the manner illustrated in Fig. 58.

Fig. 58 shows a periscope of submarine type, which is built up by adding to the simple periscope just described two optical elements 120 and two optical elements 170 in supports consisting of constructional elements whose arrangement will be sufficiently clear from the drawing.

Fig. 59 shows the optical system of a camera obscura adapted to be placed in the aperture of any suitable dark chamber.

The two cradle elements 330, 330$^a$, jointed together as shown is Figs. 31$^a$, 31$^b$, 31$^c$, may be used as an angle of sight instrument or rangefinder, for which purpose they may be mounted on the stand 270, 280 by means of the stage element 350 attached thereto in the same manner shown in Fig. 61, and, for the former purpose, the angle subtended at the point of observation, by any two objects may be found by setting the sights 334, 335, on each of the two elements 330, 330$^a$, respectively, in line with such objects and determining the angle by measuring the distance between the two measuring points 333 and by reference to the table described in connection with Figs. 31$^a$, 31$^b$, 31$^c$. A convenient manner of using this device as a rangefinder is to set the measuring points 333 at such separation that the pairs of sights 334, 335, are at right-angles to one another, for which purpose we prefer to so construct the elements 330, 330$^a$ that the said distance is one standard foot. The observer, having found a point on a base line where the object lies on one pair of sights when the base line lies on the other pair, readjusts his instrument so that the angle between the sights is one in ten either greater or less than 90°, i. e., either 95° 43′ or 84° 17′. He then moves along the base line from his first point of observation to a second point at which the object again lies on one pair of sights while the base line lies upon the other pair. By measuring the distance along the base line between his two points of observation, he thus determines the distance of the object from the first point of observation as being ten times the distance between the two points of observation. Obviously, this method may be applied by using angles other than those specified.

Fig. 60 shows a sextant mounted upon the stand 270, 280 by means of the stage 350 and a special sheet metal stamping $e$ which supports the two cradle elements 330, 330$^a$, and which, together with the element 330 carrying the sheath element 50, is fastened rigidly to the stage by means of the pivot 330$^b$ and the screw $e^1$. The second element 330$^a$ is pivotally attached to the stamping $e$ by means of a second pivot element and stud 390, which serve also to support the index mirror 240. The bridge element 370 is clamped by the stud 390 between the element 330$^a$ and a lug of the element 240 so as to fix the element 240 rotationally on the stud element 390 and thereby rigidly to the element 330$^a$ which becomes the index arm of the sextant. This arm, normally free to pivot about element 390, may be clamped to the plate $e$ by means of the screw $e^2$ passing into a nut below the arc-shaped slot $e^3$ in the plate $e$. The element 230, which serves as the horizon mirror, is carried adjustably from the pillar element 270 by means of the clip element 340, with its edge 238, Fig. 22$^a$, lowermost and at the level of the axis of the sheath element 50. The sheath 50 is provided with a peep-hole element 70 through which the observer sights objects in the usual way, and normally the mirror elements 230 and 240 are so set rotationally on their supports that, when the two cradle elements 330 and 330$^a$ are at right-angles as shown by the distance between their measuring points 333, the two parts of an object seen respectively below and in the horizon mirror 230 appear unbroken. The angle subtended between any two different objects which are brought into line by movement of the index arm 330$^a$, is preferably determined by measurement between the two measuring points 333 and reference to a printed table of such measurements with corresponding angles. Alternatively, a scale of angles may be provided on the edge of the instrument, for example on the edge 338. Instead of the peep-hole element 70, a telescope may be provided in the sheath element 50 by placing therein, for example, the arrangement of elements shown in Fig. 48.

Fig. 61 shows a spectroscope which is also conveniently mounted on the stage element 350 of the stand 270, 280. The two cradle elements 330 and 330$^a$ are attached to the stage by means of their junction pivot 330$^b$, which serves also to hold the special bracket $e^{10}$ stamped from sheet metal and adapted to support the prism element 260 and the cradle element 310 which serves as a shield for extraneous light and whose spring 316 serves to hold the prism to its support $e^{10}$. The sheath element 50 in the cradle 330 contains preferably the arrangement of elements shown in Fig. 50.

Figs. 62$^a$, 62$^b$ show a heliograph, in which one of the cradle elements 330, 330$^a$ has attached to it three supporting feet, of which two are provided by the extremities of the bracket element 320 shown more particularly in Figs. 30$^a$, 30$^b$, 30$^c$, while the third is provided by the stud element 390 fastened by two nuts to the cradle 330$^a$, and whose sleeve serves for adjustment of its height. The element 120, supported as shown in the cradle element 330$^a$, serves as an objective to form an image of the distant station in the aperture of the peep-hole element 70, and this image is viewed by means of an eyepiece contained in the eyecup element 150, which eyepiece is preferably built up in the manner shown in Fig. 38, but the cage element 180 is preferably placed as shown in Fig. 62$^a$, with its cross-wires in the aperture of the element 70. By these means the point of observation at the distant station is laid in the centre of the peep-hole element 70. The eyepiece element 150 is supported by the clip element 340 pivotally from the cradle 330$^a$ by means of the pivot 330$^b$, so that, after the distant station is laid as above, the clip element 340 may be turned about its pivot so as to withdraw the eyepiece and bring into the axis of the telescope the spherical mirror element 250, which is supported adjustably for height from the clip element 340 by means of a special stamping $x$ pivotally adjustable about a screw $x^1$ and having a handle $x^2$ by which it may be moved, and a lug $x^3$ pierced by a hole in which lies the spherical mirror element 250. By combining the pivotal movements of the stamping $x$ and the clip element 340, the spherical mirror may be adjusted in all directions transversely to the axis of the telescope and is finally brought into such position that the observer, having previously laid the distant station in the peep-hole as above and looking through the objective in the direction of the arrow in Fig. 62$^a$, sees light from the sun or a bright sky or other source of illumination reflected from the spherical mirror through the center of the peep-hole. He then knows that the light from the mirror, rendered parallel by the element 120, is projected on the distant station and available for signalling in the usual way.

Fig. 63 shows a binocular telescope formed by placing two similar telescopes in the cradle elements 330, 330ª, which are linked together by means of the two bracket elements 320 and screws at the points $f^{10}$, $f^{11}$, $f^{12}$, $f^{13}$. These screws are arranged in pairs on lines $w$—$x$, $y$—$z$, parallel to one another but normally diagonal to the axes of the telescopes, so that the interocular distance of the telescopes may be adjustably varied by relative longitudinal movement of the cradle elements 330, 330ª. The telescopes may be any of those described and shown in Figs. 47 to 50.

We have now described and illustrated a number of different optical instruments built up of interchangeable constructional optical and mechanical elements according to this invention, and it will be obvious to every experienced optician and scientist that this variety of instruments built from such elements may be extended almost indefinitely. For example, a reflecting level may be built by supporting the mirror element 230 by means of the retainer element 140 hooked into one of its screw holes 151. Again, the mirror element 210 may be placed in the sheath element 50 of the microscope so as to show multiple images of an object, or the spherical mirror element 250 may be used in combination with any of the telescopes as an artificial star for studying their aberrations.

What is claimed is:

1. Apparatus comprising optical elements and holding, shrouding, supporting and connecting elements, so formed and so proportioned one to another that they may be detachably connected with one another in different combinations and relationships to form complete adjustable optical instruments of different kinds.

2. Apparatus comprising optical elements and sheet metal holding, shrouding, supporting and connecting elements, so formed and so proportioned one to another that they may be detachably connected with one another in different combinations and relationships to form complete adjustable optical instruments of different kinds.

3. Apparatus comprising a tubular element, supporting and connecting elements, and optical elements including lenses interchangeably mountable in the tubular element, the aforesaid elements being so formed and so proportioned one to another that they may be detachably connected with one another in different combinations and relationships to form complete optical instruments of different kinds.

4. Apparatus comprising a tubular element, supporting and connecting elements, and optical elements including lenses individually and collectively mountable in the tubular element to furnish a series of lenses whose focal lengths are in substantial geometric progression, the aforesaid elements being so formed and so proportioned one to another that they may be detachably connected with one another in different combinations and relationships to form complete optical instruments of different kinds.

5. Apparatus comprising a tubular element, optical elements including lenses interchangeably mountable in the tubular element and elements for use outside the tubular element, and connecting elements for connecting the outside optical elements to the tubular element in various relationships, the aforesaid elements being so formed and so proportioned one to another that they may be detachably connected with one another in different combinations and relationships to form complete optical instruments of different kinds.

6. In apparatus comprising optical and mechanical elements for making optical instruments of different kinds, the combination of two tubes having a telescopic connection, eye-piece lenses mounted in one of said tubes, and objective lenses interchangeably mountable in the other of said tubes and so related to the eye-piece lenses and the lengths of the tubes that when one of them is mounted in said tube a telescope is formed and that when the other of them is mounted in said tube a microscope is formed.

7. In apparatus comprising optical and mechanical elements for making optical instruments of different kinds, the combination of two tubes, the one fitting within the other, eye-piece lenses detachably mounted in the inner tube, an objective lens detachably mountable in one end of the outer tube to form a microscope, a third tube slidably mountable in the outer tube, and an objective lens detachably mountable in said third tube and so related to the eye-piece lenses as to form a telescope when so mounted.

8. In apparatus comprising optical and mechanical elements for making optical instruments of different kinds, the combination of two tubes, one slidably mounted in the other, a set of lenses, a glass disc and retaining means so formed and so related that they may be mounted in the tubes in different combinations and relationships to form with the tubes either a telescope, a microscope, or a camera.

9. An apparatus comprising optical and mechanical elements for making optical instruments of different kinds, the combination of two tubes, one slidably mounted in the other, a lens detachably mounted in one of said tubes, and a ground glass disc detachably mounted in the other of said tubes to provide a camera, and a set of three mirrors and an additional glass disc adapted to be combined with said elements to form a kaleidoscope.

10. In apparatus comprising optical and mechanical elements for making optical instruments of different kinds, the combination of a large tube, an objective lens detachably mounted in one end of said tube, a small tube, means for detachably and adjustably mounting the small tube within one end of the large tube, and a set of lenses and retaining means so formed and so related that they may be mounted in the small tube in different combinations and relationships to form therewith either a complete small telescope or the eye-piece of a large telescope comprising also the large tube and the objective lens.

11. In apparatus comprising optical and mechanical elements for making optical instruments of different kinds, the combination of two tubes of the same diameter, a sleeve for detachably connecting said tubes endwise, and a set of lenses and focusing pieces so formed and so related that they may be mounted in the tubes in different combinations and relationships to form with the tubes either two complete short telescopes or one complete long telescope.

12. In apparatus comprising optical and mechanical elements for making optical instruments of different kinds, the combination of two tubes, means for detachably connecting said tubes endwise, means for detachably connecting said tubes side by side, and a set of lenses and focusing pieces so formed and so related that they may be mounted in the tubes in different combinations and relationships to form with the tubes, when connected endwise, a complete telescope, and to form with the tubes, when connected side by side, a pair of binoculars.

13. In apparatus comprising optical and mechanical elements for making optical instruments of different kinds, the combination with two tubes and a mirror, of a sleeve having arms and adapted to connect the tubes endwise to form a telescope body and to support the mirror at the end of one of the tubes to form part of a periscope.

14. In apparatus comprising optical and mechanical elements for making optical instruments of different kinds, the combination with a tube and optical elements detachably and interchangeably mounted therein, of a tube-holding element, a stand, and a swivel, so formed that the tube-holding element may be detachably connected with the swivel and the swivel mounted on the stand to provide an optical instrument having an adjustable axis, and that the tube-holding element may be secured directly to the stand to form an optical instrument with a fixed axis.

15. In apparatus comprising optical and mechanical elements for making optical instruments of different kinds, the combination with a stand and a tube containing lenses, and a swivel which may be detachably mounted on the stand, of an element so formed that it may hold said tube rigidly, and that it may be mounted either on said swivel or directly on said stand.

16. In apparatus comprising optical and mechanical elements for making optical instruments of different kinds, the combination with a stand and a tube containing lenses, and a swivel which may be detachably connected to the stand, of a spring element so formed that it may hold said tube for longitudinal adjustment, and that it may be mounted either on said swivel or directly on said stand.

17. In apparatus comprising optical and mechanical elements for making optical instruments of different kinds, the combination with a stand and a tube containing lenses, and a swivel which may be detachably connected to the stand, of an element for holding the tube fixed, mountable both on said swivel and directly on said stand, and a spring element for holding said tube adjustably, also mountable both on said swivel and directly on said stand.

18. In apparatus comprising optical and mechanical elements for making optical instruments of different kinds, the combination of a hollow pillar containing perforations, a shrouding tube having substantially the same external diameter as the pillar, optical elements interchangeably mountable in the tube, a holding element adapted interchangeably to embrace said tube or said pillar and having a perforated portion, and perforated connecting elements attachable to the pillar and to the perforated portion of the holding element.

19. In apparatus comprising optical and mechanical elements for making optical instruments of different kinds, the combination of a tube of fixed dimeter, a contractable and expandible outer tube whose inside diameter is greater than the outside diameter of the first tube when the outer tube is expanded and less than the outside diameter of the first tube when the outer tube is completely contracted, and an expandible and contractable element adapted to fit within the first tube and having a diameter greater than the internal diameter of the first tube when said element is expanded and less than the internal diameter of the first tube when the element is contracted.

20. In apparatus comprising optical and mechanical elements for making optical instruments of different kinds, the combination of a tube, a set of optical elements adapted to be placed therein, a set of tubular spacers of different lengths adapted to fit within the tube and position optical elements in different predetermined relations, and resilient retainers adapted to engage the inner surface of the tube to hold frictionally therein and to retain optical elements and spacers therein.

21. In apparatus comprising optical and mechanical elements for making optical instruments of different kinds, the combination of a tubular element, optical elements adapted to fit interchangeably within said tubular element, resilient retaining elements adapted to fit within said tubular element when contracted and to secure any of said optical elements in any desired position within said tubular element.

22. In apparatus for making optical instruments, a tubular element comprising a piece of sheet metal formed into a hollow cylinder and having overlapped edges which are secured together only at the central portion of the element so that the end portions of the element are resilient, and a focusing tube adapted to slide into either of said end portions for longitudinal adjustment therein and to be held frictionally in any desired position by the resilient contraction thereon of said end portion.

23. In apparatus for making optical instruments, a tubular element having an internal abutment, an optical element adapted to fit within the tubular element and against said internal abutment, and a resilient element adapted to fit within said tubular element when contracted and to engage the inner surface of the tubular element to retain the optical element in position.

24. In apparatus for making optical instruments, a tubular element having an internal abutment, a spacer adapted to fit within the tubular element and against said internal abutment, an optical element adapted to fit within the tubular element and against said abutment or said spacer, and a resilient element adapted to fit within said tubular element when contracted and to engage the inner surface of the tubular element to retain the optical element in position.

25. In apparatus for making optical instruments the combination of a tubular element and a retaining element adapted to fit within said tubular element, said retaining element comprising an abutment adapted to engage an optical element and a resilient portion adapted to engage frictionally the inner surface of said tubular element and to hold said abutment squarely therein.

26. In apparatus for making optical instruments, the combination of a tubular element and a retaining element adapted to fit within said tubular element, said retaining element comprising a ring and three equally spaced resilient prongs extending from the ring at an angle slightly exceeding 90° to the plane of the ring and adapted to engage frictionally the inner surface of said tubular element and to hold the ring squarely therein.

27. In apparatus for making optical instruments, a tubular element, a resilient retaining element adapted to fit and hold within said tubular element, a lens element adapted to engage the retaining element, and an element having an annular end and spring prongs formed to engage the retaining element and position said annular end in the focal plane of a lens engaging the retaining element.

28. In apparatus for making optical instruments, a tubular element, two lens elements, a spacer adapted to space the lens elements at a predetermined distance from each other, and two retaining elements adapted to slide within the tubular element and each having an abutment adapted to hold one of the lens elements against the spacer element and a resilient portion adapted to engage frictionally the inner surface of the tubular element and to position the said abutment and lens element squarely in the tubular element.

29. In apparatus for making optical instruments, a holding element, and a plurality of optical elements adapted to fit interchangeably within said holding element, said optical elements being provided with rims of uniform exterior diameter formed by compressing plastic metal on to the peripheral edges of said elements.

30. In apparatus for making optical instruments, the combination with a tube containing lenses, of a tube-holding element having a spring adapted to engage the tube and four bearing points against which the tube is urged by said spring, positioned to support the tube stably so that the tube may be adjusted longitudinally in the holding element without changing the position of its axis with respect to the holding element.

31. In apparatus for making optical instruments, the combination with a tube containing lenses, of a tube-gripping element comprising a plate having two portions extending at an angle to each other to form a crutch, and a spring clip adapted to press a tubular element into said crutch.

32. In apparatus for making optical instruments, a tube-gripping element comprising a plate having two portions extending at an angle to each other to form a crutch and having projections providing four bearing points, and a spring adapted to press a tubular element into said crutch and against said four bearing points.

33. In apparatus for making optical instruments, a tube-gripping element comprising a plate having two portions extending at an angle to each other to form a crutch and having transverse ribs extending around the angle thereof, and a spring adapted to press a tubular element into contact with said ribs at four points.

34. In apparatus for making optical instruments, an element for adjustably mounting a small tube axially within a large tube, comprising an element adapted to fit in the large tube and having four bearing points adapted to engage the outer surface of the small tube and position it axially within the large tube, and a resilient member mounted on the box and adapted to engage the small tube and urge it against said four bearing points.

35. In apparatus for making optical instruments, a tubular element, optical elements interchangeably mountable therein, a supporting element comprising a plate having an annular boss and a stud at the center of said boss, and a tube-gripping element having a portion adapted to grip said tubular element externally and a plate having a hole to engage said stud, and bosses positioned to bear on said annular boss at three equally spaced points.

36. In apparatus for making optical instruments, the combination of an element comprising a plate having projecting therefrom a central stud having an enlarged head, and a second element comprising a plate containing a button-hole adapted to be fitted over said stud and being adapted to bear on said first-mentioned plate when the elements are secured together with said button-hole in engagement with said stud.

37. In apparatus for making optical instruments, the combination of a pillar element of circular section and a swivel element detachably mounted to rotate about the axis of said pillar and comprising a plate having at one end a projection adapted to engage one end of said pillar, and having at its other end a projection adapted to engage the exterior of said pillar at some distance from said end thereof.

38. In apparatus for making optical instruments, the combination of a swivel element comprising a plate having an annular boss and a stud in the center thereof, a projection at one end of said plate adapted to fit within the end of a hollow pillar, and a projection at the other end of said plate adapted to embrace said pillar.

In testimony whereof I have hereunto set my hand in the presence of two subscribing witnesses.

WILLIAM TAYLOR.

Witnesses:
ROBERT DOUGLAS BENNETT,
ELSIE MADY BENT.